United States Patent [19]

Howard

[11] Patent Number: 6,041,173

[45] Date of Patent: Mar. 21, 2000

[54] METHOD AND SYSTEM FOR SIMULATING FOREST MANAGEMENT

[75] Inventor: Richard T. Howard, Portland, Oreg.

[73] Assignee: Assisi Software Corporation, Portland, Oreg.

[21] Appl. No.: 09/280,141

[22] Filed: Mar. 26, 1999

Related U.S. Application Data

[63] Continuation of application No. 08/970,364, Nov. 14, 1997, Pat. No. 5,963,733
[60] Provisional application No. 60/031,826, Nov. 26, 1996.

[51] Int. Cl.[7] ........................................... G06G 7/48
[52] U.S. Cl. ............................ 395/500.27; 395/500.32
[58] Field of Search ........................... 395/500.27, 500.32

[56] References Cited

U.S. PATENT DOCUMENTS

| 5,369,570 | 11/1994 | Parad | 364/401 |
| 5,930,154 | 7/1999 | Thalhammer-Reyero | 395/500.27 |

*Primary Examiner*—Kevin J. Teska
*Assistant Examiner*—Hugh Jones

*Attorney, Agent, or Firm*—McDonnell, Boehnen Hulbert & Berghoff; Stephen Lesavich

[57] ABSTRACT

Method and system for simulating forest management is provided. The forestry simulation system includes a library of object-oriented modules for simulating forest resources and various forestry management actions. The method includes initiating a simulation of forest resources over a pre-determined period of time using the object-oriented forest resource modules and description of forest resources such as trees and stands. Forestry management actions are periodically applied to the simulated forest resources. The object-oriented forestry simulation system also includes a windowed graphical user interface that is used to view multiple forestry management factors as the forestry simulation progresses. The method and system use object-oriented technologies to create a library of programmable components that is comprehensive, customizable and reflective of real world forest management. The method and system simulate many aspects of forest management simultaneously including: forestry operations, organization cash flow, multiple land use management and environmental quality.

9 Claims, 12 Drawing Sheets

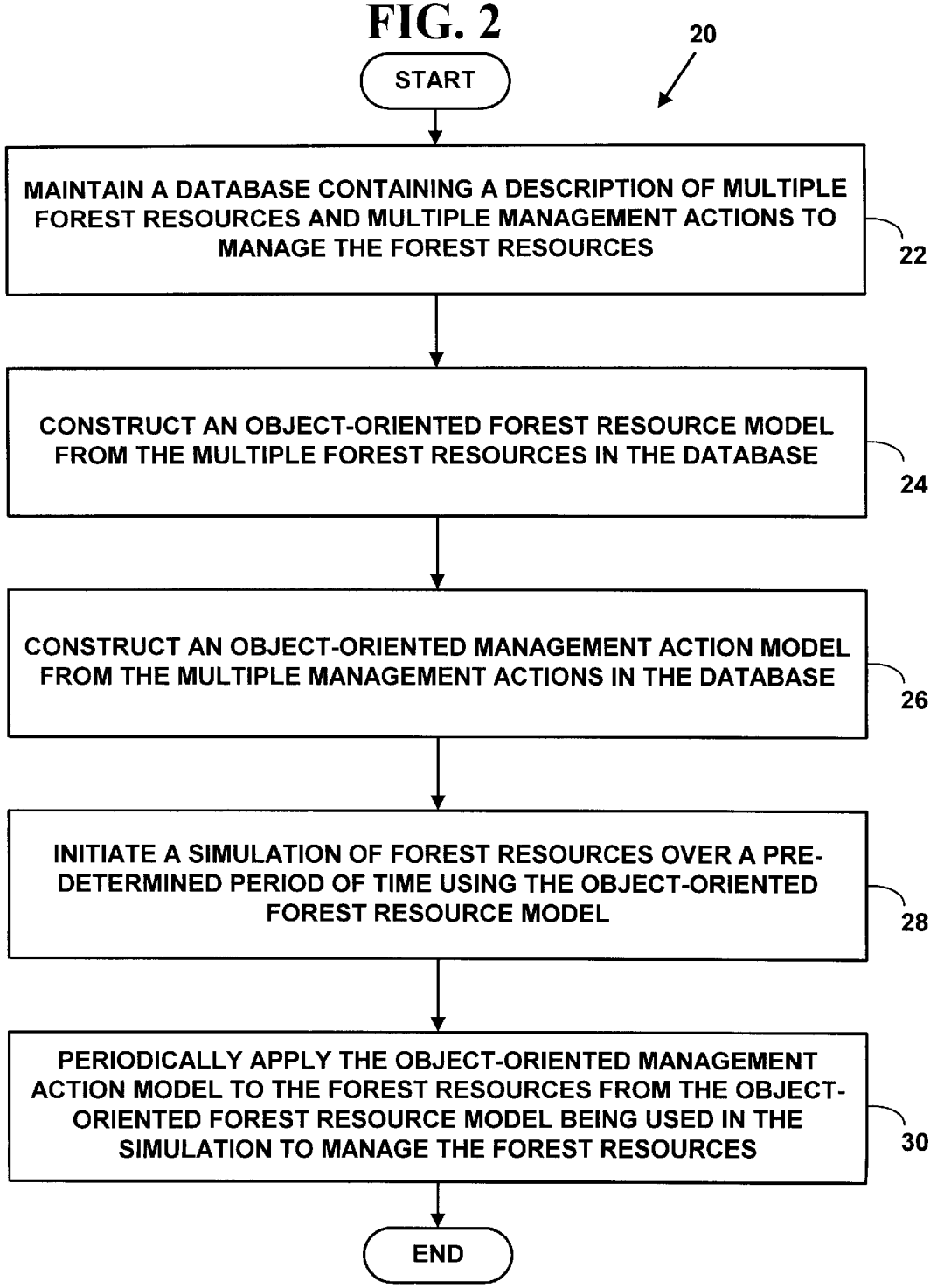

FIG. 3

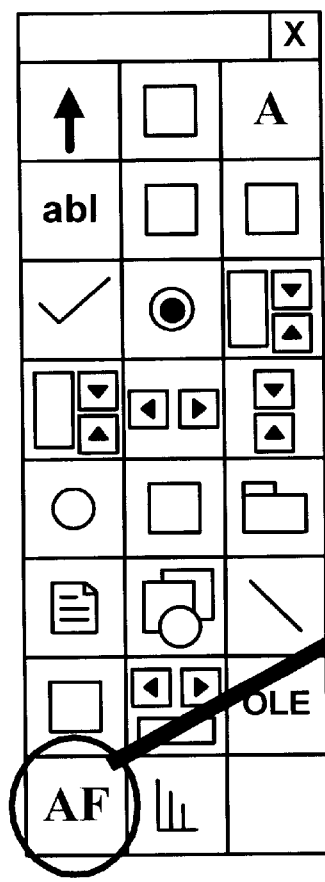

FOREST CONTROL

MEMBERS:
Organization
Simulation
Reset

EVENTS:
AccountantBeforeCloseBooks
AccountantAfterCloseBooks
AccountantBeforeOpenBooks
AccountantAfterOpenBooks
ForestManagerAction
HarvesterPostHarvest
HarvesterPreHarvest
PlanterPostPlant
PlanterPrePlant
SimulationBegin
SimulationFinished
SimulationTimer
VolumeCalculatorPreCalc
VolumeCalculatorPostCalc

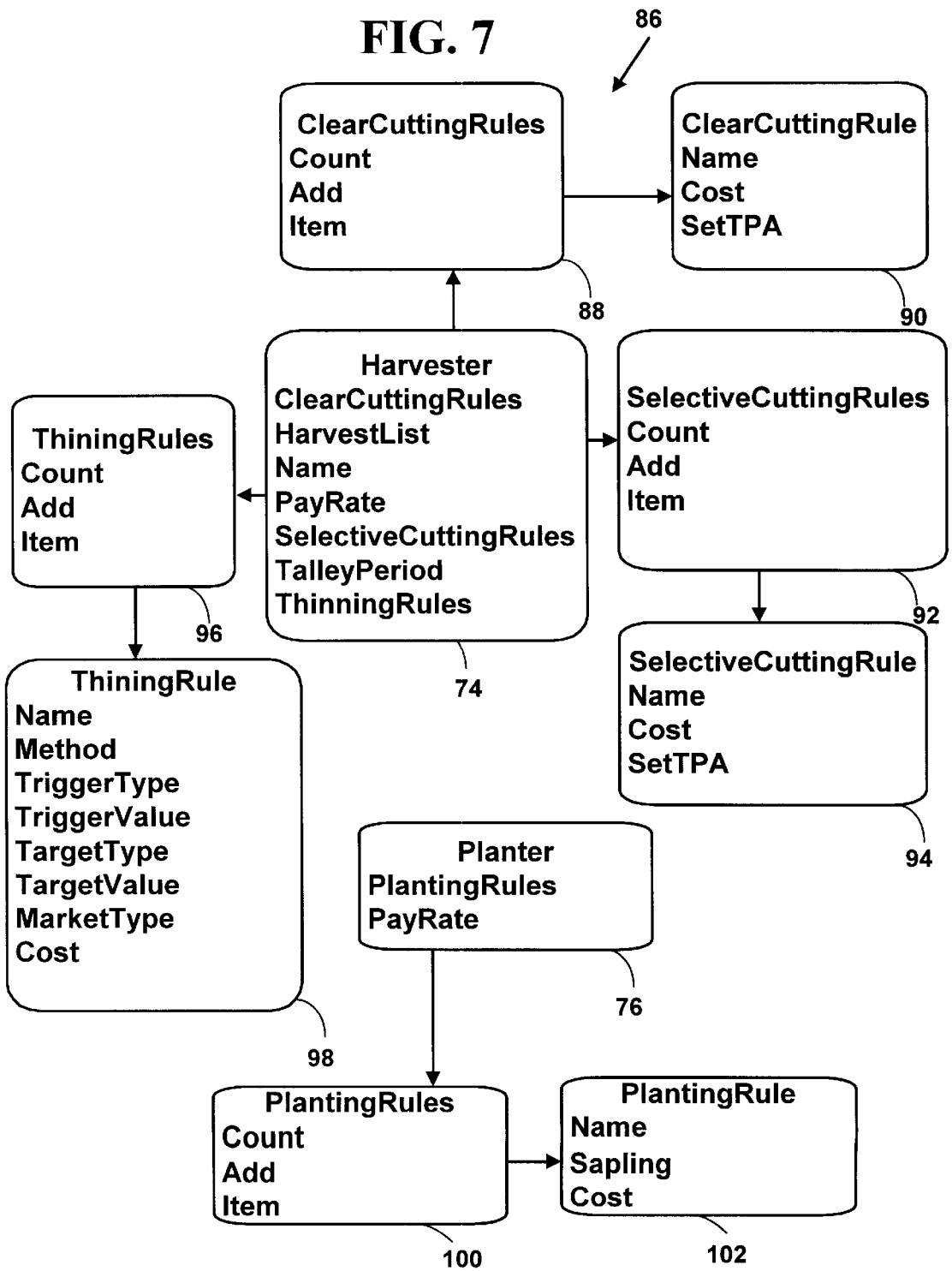

FIG. 11

ASSISI FOREST 98 - D:\DATABASE\ASSISI\FORESTSAMPLEDATABASE.MDB

FILE  EDIT  VIEW  RUN  TOOLS  WINDOW

SETUP  RUN  STEP  STOP  CLEAR  STOP  PERIOD 20  CURRENT PERIOD 20  STATUS  FINISHED

STANDING VOLUME BY STAND, TREE CLASS AND LOG VIEWER | MANAGEMENT VIEWER

STAND 85 SAMPLE

VOLUME STANDING BY STAND, TREE CLASS AND LOG
DATABASE: D:\DATABASE\ASSISI\FORESTSAMPLEDATABASE.MDB
PLAN: BUCKET PLAN, EVEN FLOW
VOLUME TYPE: BOARD, SCRIBNER DECIMAL C/AC
PERIOD=20   STAND=85   AC=7.440

GRAND FIR WWO | DBH: 15.145  HT: 89.929  TPA: 76.0

| LOG | DIAM | LEN | TOTAL | GROSS | NET |
|---|---|---|---|---|---|
| 1 | 9 | 32 | 9.780 | 9.780 | 9.780 |
| 2 | 5 | 32 | 3.924 | 0.000 | 0.000 |
| 3 | 6 | 4 | 0.964 | 0.000 | 0.000 |

DOUGLAS FIR WWO | DBH: 22.690  HT: 118.287  TPA: 86.8

| LOG | DIAM | LEN | TOTAL | GROSS | NET |
|---|---|---|---|---|---|
| 1 | 15 | 32 | 28.916 | 28.916 | 28.916 |
| 2 | 11 | 32 | 14.897 | 14.897 | 14.897 |
| 3 | 5 | 32 | 3.924 | 0.000 | 0.000 |
| 4 | 6 | 3 | 0.848 | 0.000 | 0.000 |

MANAGEMENT PLAN
11/11/97  5:43:02 PM
PLAN: BUCKET PLAN, EVEN FLOW

| PERIOD | STAND | ACTION | RULE |
|---|---|---|---|
| COMMENTS | | | |
| 1 | 89 | CLEAR CUT | CABLE |
| 1 | 93 | CLEAR CUT | CABLE |
| 1 | 89 | PLANT | FIR |
| 1 | 93 | PLANT | FIR |
| 1 | 90 | THIN | 1ST COMMERCIAL |
| 3 | 89 | THIN | PRE-COMMERCIAL |
| 3 | 93 | THIN | PRE-COMMERCIAL |
| 6 | 88 | CLEAR CUT | CABLE |
| 6 | 84 | CLEAR CUT | CABLE |
| 6 | 88 | PLANT | FIR |
| 6 | 84 | PLANT | FIR |
| 7 | 92 | CLEAR CUT | CABLE |
| 7 | 92 | PLANT | FIR |
| 8 | 86 | CLEAR CUT | CABLE |
| 8 | 86 | PLANT | FIR |

METHOD AND SYSTEM FOR SIMULATING FOREST MANAGEMENT

CROSS REFERENCES TO RELATED APPLICATIONS

This Application is a Continuation of application Ser No. 08/970,364, filed on Nov. 14, 1997, now U.S. Pat. No. 5,963,733, that issued on Oct. 5, 1999, that claims priority from Provisional Application No. 60/031,826, filed Nov. 26, 1996.

FIELD OF INVENTION

The present invention relates to computer simulation. More specifically, it relates to a method and system for simulating forest management.

BACKGROUND OF THE INVENTION

Computer simulations have been used for a number of years in forestry management. There are a number of different computer simulations known in the art that are used for forestry management. Forest inventory systems provide for a picture of timber resources at a specific moment in time. Forestry growth systems with mathematical growth models provide a way of simulating tree growth. Harvest schedule systems produce harvest and planting schedules find optimum harvest schedules for one or more stands of trees.

These forestry simulation tools have proven effective for specific applications, but they are difficult to use and customize. There are also a number of problems associated with using forestry simulations systems known in the art. Some of forestry simulation systems require a forestry manager input a large data file as batch job on a large mainframe computer and cannot be used on a time-shared computer. The batch forestry simulation may run for a significant amount of time, and the forestry simulation results are not instantaneous, but are delayed by some time period (e.g., a half-hour).

Other forestry simulation systems are used on personal computers but are application specific and are not designed to simulate more than one or two aspects of forest management at one time. Forestry simulation systems know in the art and used on personal computers are also written in programming languages like the C programming language that do not allow re-use of source code modules and are not easily adaptable. The forestry simulation systems known in the art typically do not have a graphical user interface that allow easy interaction with the underlying forestry simulation systems.

Today's forest manager should consider many complex factors simultaneously when managing forested land. Forestry management systems known in the art that consider one or two forestry management factors in isolation have proved to be ineffective in many situations to make accurate predictions for the management of forest lands.

Complex factors such as timber management, wildlife management, recreation, environmental quality and others are interrelated and need to be simulated together and not in isolation. Forestry simulations known in the art do not address today's complex forest management needs. The effective management of forest resources for multiple use has been hampered by a dearth of good simulation tools that can effectively consider multiple goals simultaneously.

SUMMARY OF THE INVENTION

In accordance with an illustrative embodiment of the present invention, the problems associated with simulating forestry management are overcome. A method and system are provided for simulating forestry management with an object-oriented forestry simulation that takes into account multiple complex factors. As is known in the art, object-oriented programming is used to design computer software that is easy to create, cost effective to modify and reusable. The object-oriented forestry simulation system includes a library of object-oriented modules for simulating various aspects of forestry management. The object-oriented forestry simulation system also includes a windowed graphical user interface that is used to view multiple forestry management factors as the forestry simulation progresses.

The object-oriented forestry simulation method includes maintaining a database containing a description of multiple forest resources and multiple management actions for managing the forest resources. The forest resources include trees, stands and wildlife. The management actions include cruise, grade, harvest, clear cut and plant. However, more or fewer forest resources and management methods could also be used.

An object-oriented forest resource model is constructed from the multiple forest resources in the database. An object-oriented management model is constructed from the multiple management actions in the database. The object-oriented management model is used for managing forest resources in the forest resource model. A simulation of forest resources over a pre-determined period of time is initiated using the object-oriented forest resource model. Periodically, the object-oriented management model is applied to the forest resources from the object-oriented forest resource model being used in the simulation to manage the forest resources.

An illustrative embodiment of the present invention uses object-oriented technologies to create a library of programmable components that is comprehensive, customizable and reflective of real world forest management. An illustrative embodiment of the present invention is capable of simulating many aspects of forest management simultaneously including: forestry operations, organization cash flow and environmental quality. An illustrative embodiment of the present invention allows forestry management to simultaneously consider multiple factors in designing a forest management plan and thereby provides solutions to forestry questions, such as multiple use management, that are difficult to answer.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 2 is a flowing diagram illustrating a method for forestry simulation;

FIG. 3 is a block diagram illustrating a Forest Control object;

FIG. 7 is a block diagram illustrating Rule objects;

FIG. 11 is a block diagram illustrating a screen display of an exemplary forestry simulation for an illustrative embodiment of the present invention.

DETAILED DESCRIPTION OF AN ILLUSTRATIVE EMBODIMENT

Forestry Simulation System

Figure 1:
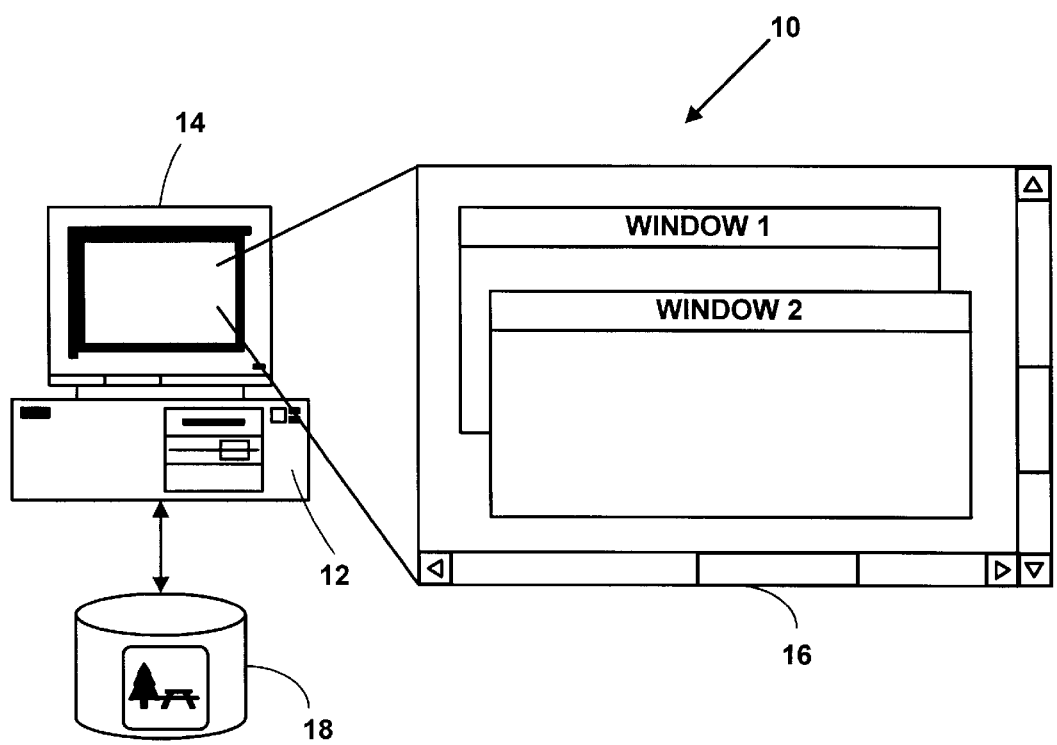
FIG. 1 illustrates a forestry simulation system.

FIG. 1 illustrates a forestry simulation system 10 for an illustrative embodiment of the present invention. Forestry simulation system 10 includes a computer 12 with a computer display 14. Display 14 presents a windowed graphical user interface ("GUI") 16 to a user. A database 18 contains a description of multiple forest resources and multiple management actions for the forest resources. Database 18 is stored in a memory system on computer 12 or in secondary storage such as a hard disk, floppy disk, optical disk, or other non-volatile mass storage devices.

An operating environment computer 12 of the present invention includes a processing system with at least one high speed Central Processing Unit ("CPU"). In accordance with the practices of persons skilled in the art of computer programming, the present invention is described below with reference to acts and symbolic representations of operations that are performed by the processing system, unless indicated otherwise. Such acts and operations are referred to as being computer-executed.

It will be appreciated that the acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, computer memory (e.g., RAM or ROM) and any other volatile or non-volatile mass storage system readable by the computer. The data bits on a computer readable medium are computer readable data. The computer readable medium includes cooperating or interconnected computer readable media, which exist exclusively on the processing system or be distributed among multiple interconnected processing systems that may be local or remote to the processing system.

Method of Forestry Simulation

FIG. 2 is a flowing diagram illustrating a method 20 for forestry simulation. Method 20 includes maintaining a database (e.g., database 18) containing a description of multiple forest resources and multiple management actions for managing the multiple forest resources at step 22. The multiple forest resources include trees and stands. The management methods include accounting, cruise, grade, harvest, plant and scale. However, more or fewer forest resources and management methods could also be used. The forest resources and management actions are described below.

An object-oriented forest resource model is constructed from the multiple forest resources in the database at step 24. An object-oriented management model is constructed from the multiple management actions in the database at step 26. The object-oriented management model is used for managing forest resources in the forest resource model. A simulation of forest resources over a pre-determined period of time is initiated using the object-oriented forest resource model at step 28. At step 30, the object-oriented management model is periodically applied to the forest resources from the object-oriented forest resource model being used in the simulation to manage the forest resources.

Forest Resources and Management Actions

In an illustrative embodiment of the present invention, a description of multiple forest resources and multiple management actions included in database 18 are used with method 20 of FIG. 2 to create a forestry simulation. The description of multiple forest resources includes descriptions of trees, stands, tree growth parameters, stand growth parameters and wildlife (e.g., cavity nesting birds) and others as computer data stored in database 18. However, more or fewer forest resources could also be used. The computer data stored in database 18 includes tables and other data structures.

Trees are grouped into stands that represent larger geographic areas of similar forest types. Stands may be grouped into an ownership with specific ownership forest resource data. An ownership may be grouped into an organization with specific organization forest resource data. The tree and stand growth parameters include pre-defined defined growth curve data for Diameter at Breast Height ("DBH") and total height. A DBH is known to those skilled in the forestry arts.

The description of multiple management actions includes descriptions of accounting practices and forestry management practices including cruising, grading, harvesting, planting, scaling and others (e.g., salaries of employees carrying out the management actions) as computer data stored in database 18. However, more or fewer management actions could also be used. Cruising, grading, harvesting, planting and scaling techniques are known to those skilled in the forestry arts and explained below. The multiple forest resources and multiple management actions stored as computer readable data are used to construct the object-oriented forest resource and object-oriented management action models at steps 26 and 28 of method 20 (FIG. 2).

Object-oriented Simulation Environment

In an illustrative embodiment of the present invention, object-oriented programming techniques are used. As is known in the art, an "object type," also called an "object class," comprises a data-type, services that operate on instances of the data type, and a set of object attributes in an object-oriented data-structure. An "object attribute" is a field of data in an object that partially defines that object's state. An "object service" implements and manipulates objects, usually by reading or changing the object attributes. "Object-oriented design" is a software development technique in which a system or component is expressed using objects.

An object typically is an object-oriented data-structure that has multiple components including a function table, containing a pointer to each "object member" or member function (i.e., sometimes known as an "object method") defined in the object's class, an events table, for accepting events (e.g., OLE or ActiveX control events) and a data block, containing the current values for each object variable (i.e., data members, sometimes known as an "object property"). A computer software application has some reference to an object through an object pointer. A computer software application obtains this object reference by using some type of function call (direct or implied) in which that function allocates an object block in computer memory, initializes the function table, and returns a reference to allocated computer memory to an application. The computer memory may be local or distributed on a remote computer.

The Component Object Model (COM) and Distributed Component Object Model (DCOM) are models used for object-oriented programming and known to those skilled in the art. The COM and DCOM specify how objects within a single application or between applications (e.g., client/server applications) interact and communicate by defining a set of standard interfaces. Interfaces are groupings of schematically related functions through which a client application accesses the services of a server application.

Object Linking and Embedding (OLE) controls, such as OLE Version 2 OLE controls and ActiveX Controls by the Microsoft Corporation of Redmond, Wash., are based in part on the Component Object Model and allow the creation of objects of different formats which operate on data through defined interfaces, rather than operating on the applications responsible for the data. ActiveX is based in part on OLE technologies. An OLE or ActiveX control is an object that accepts and responds to events, such as a selection by a mouse or a key on a keyboard, or a selection by another object-oriented member function. Detailed information on the OLE object interface can be found in Inside OLE, 2nd edition, by Kraig Brockschmidt, Microsoft Press, Redmond Wash., 1995 which is incorporated herein by reference.

Forest Control Object

An illustrative embodiment of the present invention includes an object-oriented library of forest resource objects and management method objects stored in database 18. The object-oriented objects are grouped according to object functionality.

In an illustrative embodiment of the present invention, the object-oriented library is accessed through a single ActiveX control called a "Forest Control object." FIG. 3 is a block diagram illustrating a Forest Control object 32. However, more controls could also be used Access to other objects in the library is made through Forest Control object 32. The Forest Control object is inserted into an ActiveX container and manipulated using an ActiveX compliant development environment. ActiveX containers are known to those skilled in the art. ActiveX compliant development environment includes languages such as Visual Basic and Visual C++ by Microsoft Corporation, and others. Once inserted, Forest Control object 32 object members give access to other objects in the object-oriented library.

Forest Control object 32 includes Organization, Simulation and Reset object members. However, more or fewer object members could also be used. The Organization object and Simulation objects are explained below. A number of ActiveX events are exposed by Forest Control object 32 so that a forestry simulation can be tracked and sampled as it is running. The ActiveX events include ForestMangerAction, HarvesterPreHarvest, HarvesterPostHarvest, PlanterPrePlant, PlanterPostPlant, AccountantOpenBooks, AccountantCloseBooks, SimulationTimer and SimulationFinished. However, more or fewer ActiveX events could also be used. For example a SimulationTimer event can be set to trigger once a year in a 100 year simulation allowing the simulated forest to be sampled for volume, timber cash flow, and habitat quality. As another example, a HarvesterPostHarvest event can be triggered after harvest events to sample a harvest volume.

Table 1 illustrates the components of the Forest Control object 32. However, more or fewer components could also be used.

TABLE 1

Forest Control object 32
Description
Forest Control object 32 is a top-level object through which other objects in the object library are accessed. Forest Control object 32 is an ActiveX/OLE control that is inserted on a form before access to other objects is possible. In addition to objects, Forest Control object 32 provides a number of events that can be trapped to facilitate tracking of forestry simulation progress.
Properties
    Organization As Organization
        The Organization object contains the Ownership,
        ForestManager and Accountant objects.
    Simulation As Simulation
        The Simulation object controls the starting and stopping of a
        simulation.
Methods
    Reset
        Reset is called to clear the current simulation from memory. It is
        typically called before creating a new simulation.
Events
The Forest Control object triggers a variety of events that can be caught in program code. The following is a list of available events. Although events are sent through the Forest Control object, they are initiated by other objects in the library and are described more fully in the text for those objects. The first word of each event designates the object that initiates the event (e.g., Accountant object for AccountantBeforeCloseBooks, etc.).
    AccountantBeforeCloseBooks
    AccountantAfterCloseBooks
    AccountantBeforeOpenBooks
    AccountantAfterOpenBooks
    ForestManagerAction(Action As Long, Stand As Stand)
    HarvesterPostHarvest(Stand As Stand)
    HarvesterPreHarvest(Stand As Stand)
    PlanterPostPlant(Stand As Stand)
    PlanterPrePlant(Stand As Stand)
    SimulationBegin
    SimulationFinished
    SimulationTimer
    VolumeCalculatorPreCalc
    VolumeCalculatorPostCalc Simulation Control Object In an illustrative embodiment of the present invention, a Simulation Control object creates a forestry simulation. The Simulation Control object creates a forestry simulation by looping through multiple forest resources objects such as trees and carrying out a list of management actions performed on the multiple forest resources objects over a pre-determined simulated time period (e.g., 100 years)

Statistics from the simulation such as the number, biomass, age of organisms (e.g., trees) and simulation time are obtained by sampling the simulation as it runs over the pre-determined simulated time period. However, sampling occurs while the simulation is temporarily stopped. There are two methods of sampling a simulation: using timer events and manually.

Timer events are triggered by the simulation when the simulation timer is set to a value>0. When a timer event is triggered, the simulation is stopped internally. Sampling can then occur using a scripting program. When the timer event procedure ends, the simulation is restarted internally. There is no need to manually stop and start the simulation using timer events.

Manually triggering a sampling entails using a scripting program to temporarily stop the simulation, sample and restart the simulation. Manually triggering a sampling is useful when sampling is needed at times that can't be expressed as intervals.

To get a picture of how one or more factors (e.g., tree growth) is changing during a forestry simulation, sampling is done with a Cruiser object or a Biologist object. The Cruiser object and Biologist objects are explained below.

Table 2 illustrates properties, methods and events of the Simulation Control object. However, more or fewer properties, method and events could also be used.

TABLE 2

Simulation Control object
Description
The Simulation Control object implements starting, stopping and stepping through forestry simulations. A timer can be set that triggers an event each period. When Simulation Control object is finished, an event signaling the stop time has been reached is triggered.
Properties
    StopTime As Long
        The time at which the simulation will stop.
    Time As Long
        Holds the current time of the simulation.
    Timer As Long
        Sets the interval between SimulationTimer events. Set to zero if no timer events are desired.
Methods
    Start( ) As Boolean
        Call to start the simulation.
    Step( ) As Boolean
        Call to simulate the next period of the simulation.
    Stop( ) As Boolean
        Call to stop the simulation.
Events
    SimulationBegin
        Triggered just before system begins simulating.
    SimulationFinished
        Triggered when the system has reached the stop time.
    SimulationTimer
        Triggered at each passing of the Timer interval. If Timer = zero then no SimulationTimer events are triggered.
Remarks
• Set the run time by setting the StopTime parameter.
• Call Start( ) to begin a simulation, Step( ) to step through a single period or Stop( ) to stop the simulation.
• Access the current time using the Time member.
• The Simulation Control object is accessed through the Forest Control object.

Figure 4:
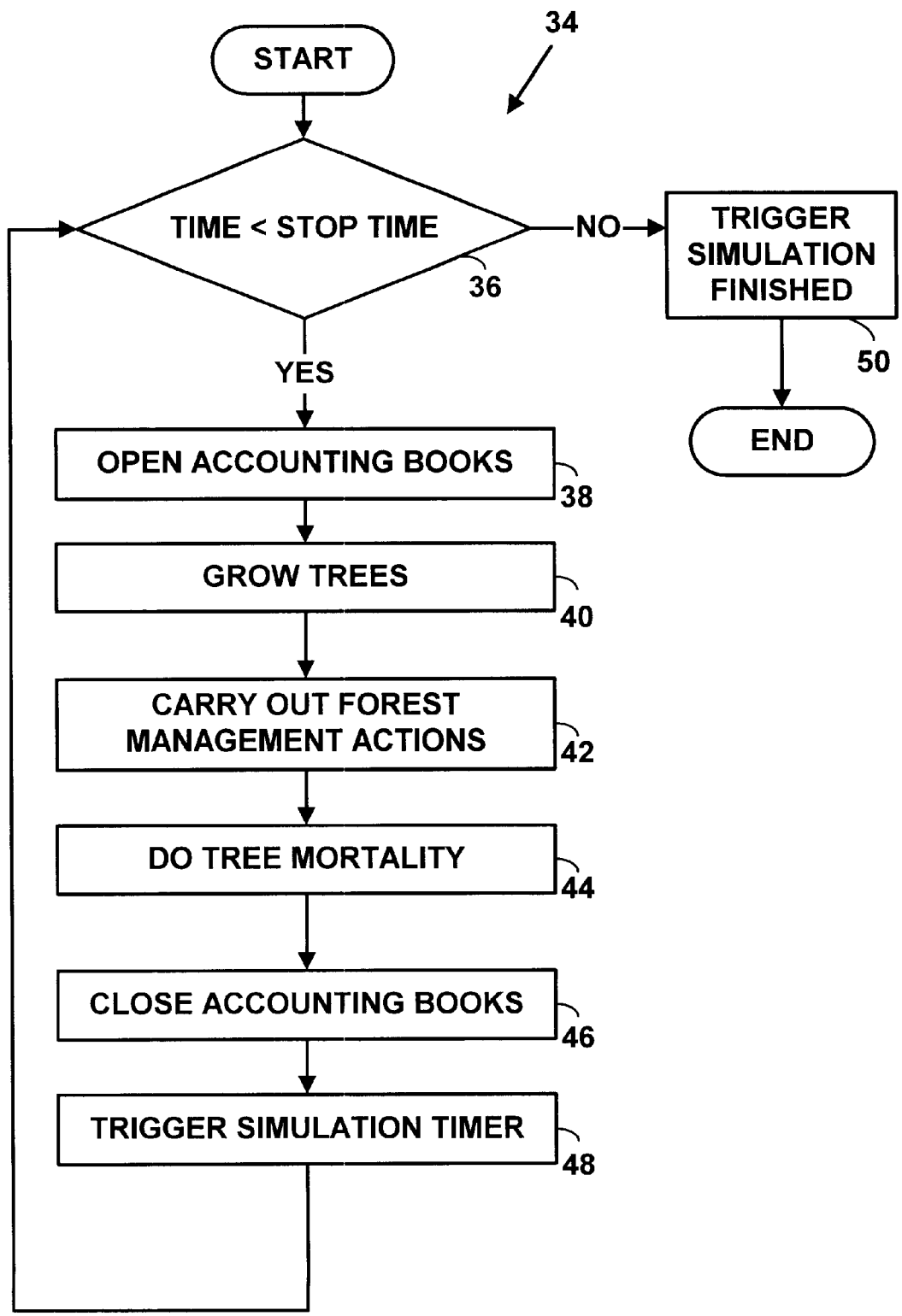
FIG. 4 is a flow diagram illustrating a method for a Simulation Control object.

FIG. 4 is a flow diagram illustrating a method 34 for the Simulation Control object to create an exemplary forestry simulation. At step 36, a test is conducted to determine whether a pre-determined time is less than a stop time. If so, at step 38 an open accounting books object member (e.g., from Accountant object) is called to track cash flow during a forestry simulation. When the accounting books are opened, income and expenses are set to zero. At step 40, a grow trees object member (i.e., from Stand object) is called to simulate the growing of trees in a stand. At step 42, one or more management actions are carried out (e.g., from ForestManager object including Biologist, Cruiser, Grader, Harvester, Planter, or Scaler objects). At step 44, an optional tree mortality object member (i.e., from Stand object) is called to simulate the mortality of trees in a stand (e.g., due to disease, insects, fires, etc.). At step 46, the accounting books are closed by calling a close accounting books object member (e.g., from Accountant object). At step 48, a simulation timer is triggered to complete the simulation with the Simulation Control object. At step 50, the Simulation Control object terminates.

However, more or fewer steps could also be used for the Simulation Control object. The steps in method 34 can also be executed in a different order than illustrated in FIG. 4 (e.g., simulation of tree mortality at step 44 can be completed on a stand of trees before management actions at step 42 are completed).

Forest Ecosystem Objects

In an illustrative embodiment of the present invention, a selected forest type is simulated corresponding to one or more ecological components in the selected forest type. The ecological components include one or more types of trees (e.g., spruce, fir, pine, etc.) Trees are described by TreeClass objects that give a number of trees by species and DBH classes. Tree growth is simulated using a pre-defined growth curve for DBH and total height. Trees are one of the multiple forest resource objects stored in database 18.

Forest Resource Objects

Figure 5:
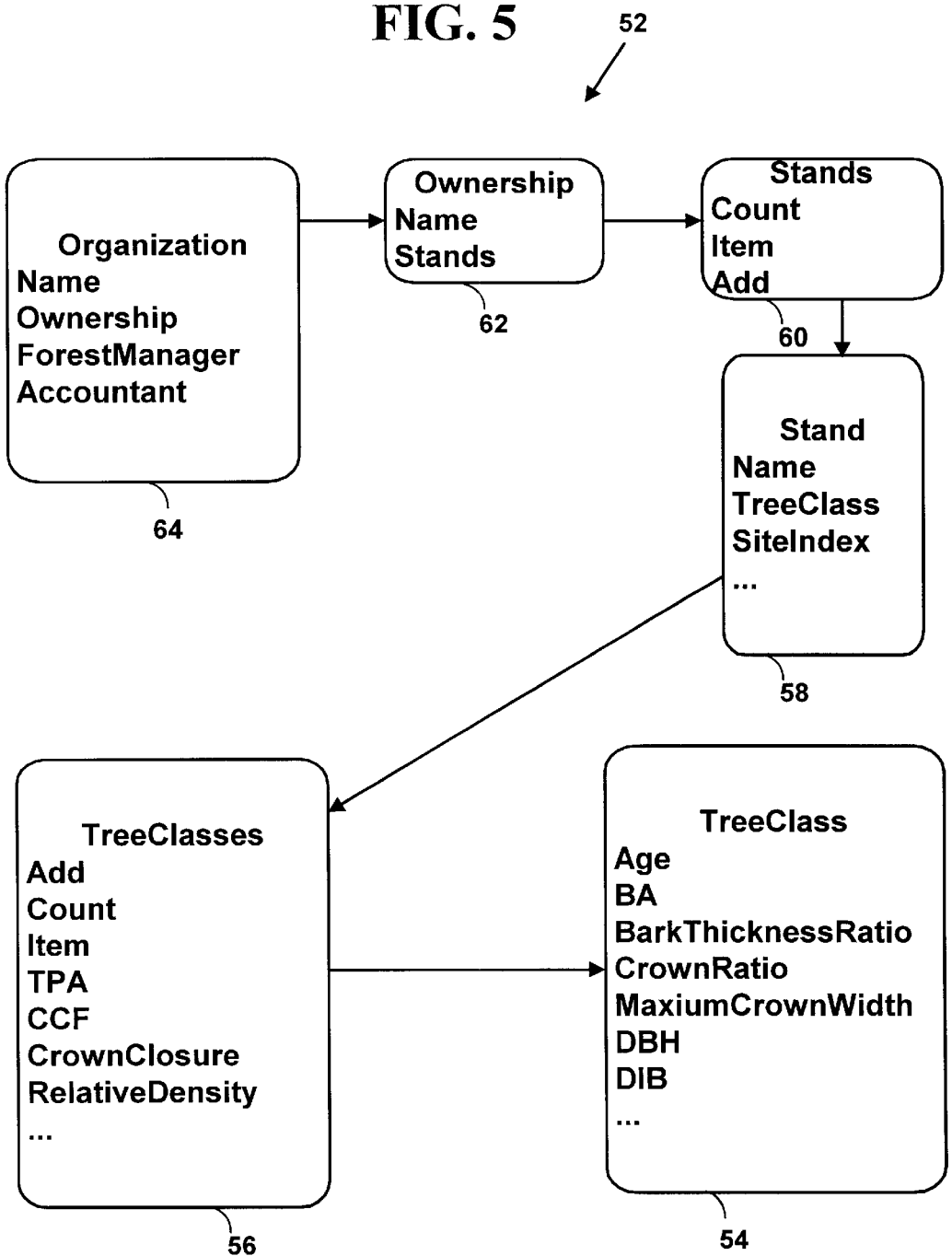
FIG. 5 is a block diagram illustrating Forest Resource objects.

FIG. 5 is a block diagram illustrating Forest Resource objects 52. FIGS. 5–10 illustrate various objects of an illustrative embodiment of the present invention. However FIGS. 5–10 may not illustrate all object properties, methods, events or members that are illustrated in the corresponding table for the object. All object properties are not illustrated in FIGS. 5–10 for the sake of simplicity.

Forest Resources objects 52 use the description of multiple forest resources in database 18 described to create an object-oriented forest resource model at step 24 of method 20 (FIG. 2). In an illustrative embodiment of the present invention, Forest Resource objects 52 include one or more TreeClass objects 54 within a TreeClasses object 56 within a Stand object 58 within a Stands object 60 within an Ownership object 62 within an Organization object 64.

TreeClass objects are represented as more specialized objects (e.g., ConeTreeClass or TaperTreeClass described below). TreeClass objects define a base set of properties, methods and events that more specialized objects implement. Trees are measured at Diameter at Breast Height ("DBH") and using Tree-Per-Acre ("TPA"). Table 3 illustrates properties, methods and events of TreeClass object 54. However, more or fewer properties, method and events could also be used.

TABLE 3

TreeClass object 54
Description
TreeClass object 54 is a generalized class of tree that defines a base set of properties, methods and events that other more specialized classes of trees implement when deriving from TreeClass object 54. For example, the ConeTreeClass and TaperTreeClass derive from TreeClass object 54 and therefore implement TreeClass object's 54 members. The ConeTreeClass object and the TaperTreeClass object are types of TreeClass object 54.
Properties
    Age As Long
        Age of the trees.
    BA As Long
        Basal area per acre.
    BarkThicknessRatio as Single
        Bark thickness ratio or diameter inside bark/diameter outside bark.
    CrownRatio As Long
        Length of crown as a percent of total height (e.g., Ritchie, 1987). Calculated as: BoleRatio = $1 - 1/(1 + \exp(b0 + b1*H + b2CCFL + b3*\ln(BA) + b4*DBH/H + b5*SI))$
        Where:
            H — Total height.
            CCFL — CCF for trees with DBH larger than this tree's DBH.
            BA — BA of stand.
            SI — Stand site index.
    MaximumCrownWidth As Long
        Width of crown if tree is open grown. Calculated as:
            MaximumCrownWidth = $MCW0 + MCW1 * DBH - MCW2 * DBH^2$
    DBH As Single
        Diameter at breast height outside bark. The bottom of a tree is assumed to be at breast height.
    DIB(Single Height) As Single
        Returns the diameter inside bark at a given height.
    DOB(Single Height) As Single
        Returns the diameter outside bark at a given height.
    Defect As Single
        Amount of volume that is not merchantable. Expressed as a percent of gross volume.

TABLE 3-continued

HeightCrownBase As Single
    Height of tree from base to base of crown.
HeightDBH As Single
    Height of tree from base to DBH point.
HeightTotal As Single
    Height of tree from base to tip.
IsMaxAgeTest as Long
    Toggles mortality based on a maximum tree age. When
    IsMaxAgeTest = True, ConeTreeClass object will die when its
    age reaches MaxAge.
MaxAge As Long
    Maximum age ConeTreeClass is allowed to obtain. Only applies
    when IsMaxAgeTest is set to true.
Species As Long
    A numeric ID representing species.
SetMCWParameters(Single MCW0, Single MCW1, Single MCW2)
    Sets the values of the maximum crown width parameters.
TaperClass As Single
    Taper class used to define shape of tree.
TPA As Single
    Trees per area. Valid if the ConeTreeClass is standing. If the
    ConeTreeClass has been harvested, the TreeCount member is
    valid.
TreeCount As Single
    The number of individual trees this ConeTreeClass object
    represents. Valid if the ConeTreeClass has been harvested. If the
    ConeTreeClass is standing, the TPA member is valid.
Methods
Events
Remarks Table 4 illustrates properties, methods and events of TreeClasses object 56. However, more or fewer properties, method and events could also be used.

TABLE 4

TreeClasses object 56
Description
TreeClasses object 56 contains a list of TreeClass 54 objects. TreeClass
objects 54 are accessed using an index.
Properties
    Count As Long
        Returns the number of TreeClass objects 54 in the list. Read
        only.
Methods
    Add( ) As Object
        Creates a new TreeClass object 54 and adds it to the list. Returns
        the TreeClass object 54 created.
    Age as Long
        Average age of tree class objects in the list.
    BA(DBH As Single) As Single
        Sum of Basal Area ("BA") for tree class objects with DBH
        larger than that given in the list.
    CCF(DBH As Single) As Single
        Crown Competition Factor ("CCF") for trees with DBH larger
        than that given (e.g., Krajicek et. al., 1961). Calculated as:
            $CCF = \Sigma(CW_i^2 * TPA_i) * \pi/4/43560$
        Where i denotes the $i^{th}$ tree class object in the list with DBH
        larger than MinDBH and $\pi$("pi") = 3.1415927 . . .
    CrownRatio( ) As Single
        Average crown ratio weighted by TPA (or TreeCount if
        TreeClasses have been harvested).
    CrownClosure(DBH) As Single
        Crown Competition Factor for trees with HeightTotal > Height.
        Calculated similarly as CCF.
    CrownWidth( ) As Single
        Crown width of trees in the list.
    DBH As Single
        Returns the arithmetic average DBH of tree class objects in the
        list.
    HeightTotal As Single
        Average total height of tree class objects in the list.
    Item(Index As Long) As Object
        Returns the TreeClass object 54 at the Index position in the list.
    QMD As Single
        Quadratic mean diameter or the DBH of a tree with average BA.

TABLE 4-continued

Calculated as: When TreeClasses object represents standing
        trees:
            $QMD = BA/TPA * 4 * 144/\pi$
        When TreeClasses object represents cut trees:
            $QMD = BA/TreeCount * 4 * 144/\pi$
    RelativeDensity As Single
        Relative density (e.g., Curtis, 1982). Calculated as:
            $RelativeDensity = BA/QMD^{1/2}$.
    RemoveAll( )
        Removes tree class objects from the list.
    Sort(Type as Long)
        Sorts the tree class objects in the list. Type interpreted as a bit
        filed where bit 1 sorts by species and bit 2 sorts by DBH.
        Sorting order parallels bit order.
    TPA(MinDBH As Single, MaxDBH As Single) As Single
        Returns the TPA for classes of trees with minimum DBH
        MinDBH and maximum DBH less than MaxDBH.
Events TreeClass objects 54 includes ConeTreeClass objects or TaperTreeClass object members. However, more or fewer TreeClass object 54 types could also be used. Cones and tapers are the two most common methods used to simulate the shape of trees in a stand. Table 5 illustrates properties, methods and events of ConeTreeClass object. However, more or fewer properties, methods and events could also be used.

TABLE 5

ConeTreeClass object
Description
The ConeTreeClass object represents a number of individual trees of the
same species and DBH classes whose shape is described by a cone with
base diameter equal to DBH and height equal to total height. The number
of trees the ConeTreeClass represents is given either in the TPA member
if the tree class is standing or the TreeCount member if the tree class has
been harvested.
Properties
    Age As Long
        Age of the trees.
    BA As Long
        Basal area per acre.
    BarkThicknessRatio as Single
        Bark thickness ratio or diameter inside bark/diameter outside
        bark.
    CrownRatio As Long
        Length of crown as a percent of total height (e.g., Ritchie,
        1987). Calculated as: $BoleRatio = 1 - 1/(1 + exp(b0 + b1*H + b2*CCFL + b3*In(BA) + b4*DBH/H + b5*SI))$
        Where:
            H — Total height.
            CCFL — CCF for trees with DBH larger than this tree's
            DBH.
            BA — BA of stand.
            SI — Stand site index.
    MaximumCrownWidth As Long
        Width of crown if tree is open grown. Calculated as:
            MaximumCrownWidth =
            $MCW0 + MCW1 * DBH - MCW2 * DBH^2$
    DBH As Single
        Diameter at breast height outside bark. The bottom of a tree is
        assumed to be at breast height.
    DIB(Single Height) As Single
        Returns the diameter inside bark at a given height.
    DOB(Single Height) As Single
        Returns the diameter outside bark at a given height.
    Defect As Single
        Amount of volume that is not merchantable. Expressed as a
        percent of gross volume.
    HeightCrownBase As Single
        Height of tree from base to base of crown.
    HeightDBH As Single
        Height of tree from base to DBH point.
    HeightTotal As Single TABLE 5-continued Height of tree from base to tip.
IsMaxAgeTest as Long
    Toggles mortality based on a maximum tree age. When
    IsMaxAgeTest = True, ConeTreeClass object will die when its
    age reaches MaxAge.
MaxAge As Long
    Maximum age ConeTreeClass is allowed to obtain. Only applies
    when IsMaxAgeTest is set to true.
Species As Long
    A numeric ID representing species.
SetMCWParameters(Single MCW0, Single MCW1, Single MCW2)
    Sets the values of the maximum crown width parameters.
TaperClass As Single
    Taper class used to define shape of tree.
TPA As Single
    Trees per area. Valid if the ConeTreeClass is standing. If the
    ConeTreeClass has been harvested, the TreeCount member is
    valid.
TreeCount As Single
    The number of individual trees this ConeTreeClass object
    represents. Valid if the ConeTreeClass has been harvested. If the
    ConeTreeClass is standing, the TPA member is valid.
Methods
Events
Remarks
  •  Trees are represented as TreeClass objects. TreeClass objects,
    whether they are ConeTreeClass objects or TaperTreeClass
    objects, describe the number of trees of a single species and
    DBH class. TreeClass objects that represent standing trees are
    counted by the Trees-Per-Acre ("TPA") member and have their
    tree count (TreeCount) member equal to zero. TreeClass objects
    that have been harvested, have their TPA values converted to
    actual tree counts (TreeCount) using the stand acres.

Table 6 illustrates properties, methods and events of TaperTreeClass object. However, more or fewer properties, methods and events could also be used.

TABLE 6

TaperTreeClass object
Description
The TaperTreeClass object represents a number of individual trees of the same species and DBH classes whose shape is described by a table of taper values.
Properties
    Age As Long
        Age of the trees.
    BA As Long
        Basal area per acre.
    BarkThicknessRatio as Single
        Bark thickness ratio or diameter inside bark/diameter outside
        bark.
    CrownRatio As Long
        Length of crown as a percent of total height (Ritchie, 1987).
        Calculated as: BoleRatio = 1 − 1/(1 + exp(b0 + b1*H +
        b2*CCFL + b3*ln(BA) + b4*DBH/H + b5*SI))
        Where:
            H — Total height.
            CCFL — CCF for trees with DBH larger than this tree's
            DBH.
            BA — BA of stand.
            SI — Stand site index.
    MaximumCrownWidth As Long
        Width of crown if tree is open grown. Calculated as:
            MaximumCrownWidth =
            MCW0 + MCW1 * DBH − MCW2 * $DBH^2$
    DBH As Single
        Diameter at breast height. The bottom of a tree is assumed to be
        at breast height.
    DIB(Single Height) As Single
        Returns the diameter inside bark at a given height.
    DOB(Single Height) As Single
        Returns the diameter outside bark at a given height.
    Defect As Single
        Amount of volume that is not merchantable. Expressed as a
        percent of gross volume.

TABLE 6-continued

HeightCrownBase As Single
        Height of tree from base to base of crown.
    HeightDBH As Single
        Height of tree from base to DBH point.
    HeightTotal As Single
        Height of tree from base to tip.
    IsMaxAgeTest as Long
        Toggles mortality based on a maximum tree age. When
        IsMaxAgeTest = True, ConeTreeClass object will die when its
        age reaches MaxAge.
    MaxAge As Long
        Maximum age TaperTreeClass is allowed to obtain. Only applies
        when IsMaxAgeTest is set to true.
    Species As Long
        A numeric ID representing species.
    TaperClass As Single
        Taper class used to define shape of tree.
    TPA As Single
        Trees per area. Valid if the TaperTreeClass is standing. If the
        TaperTreeClass has been harvested, the TreeCount member is
        valid.
    TreeCount As Single
        The number of individual trees this TaperTreeClass object
        represents. Valid if the TaperTreeClass has been harvested. If
        the TaperTreeClass is standing, the TPA member is valid.
Methods
Events
Remarks
  •  The TreeCount member describes the amount of individual trees
    represented by this tree class. It is only valid for TreeClass
    members of the Harvester.
  •  The TPA member describes the amount of individual trees per
    acre represented by this tree class. It is only valid for the
    TreeClasses member of the Stand object.

TreeClass objects 54 describe the TPA of a unique species and a DBH class. There can be as many TreeClass objects 54 as needed in a Stand object 58 and additional objects for simulating tree growth other than TaperTreeClass and ConeTreeClass objects.

Stand objects are represented as more specialized objects that derive from the Stand object. Stand objects define a base set of properties, methods and events that more specialized objects implement.

Table 7 illustrates properties, methods and events of Stand object 58. However, more or fewer properties, methods and events could also be used.

TABLE 7

Stand object 58
Description
Stand object 58 contains a list of trees.
Properties
    Area As Single
        The area of the stand.
    Name As String
        User supplied name.
    TreeClasses As TreeClasses
        A TreeClasses object that contains the tree classes present in the
        stand.
    TreeType As Long
        Sets the type of tree classes being held in this Stand object 58.
    IsMaximumAgeTest As Long
        Determines whether the maximum age test will be carried out on
        tree classes.
    IsMortality As Long
        Determines whether mortality will be carried out.
    IsRegeneration As Long
        Determines whether regeneration will be carried out.
    SiteIndex As Single
        50 year site index
    MaximumDensityCurve As Curve
        A maximum density curve used when mortality is being used.

TABLE 7-continued

PlantingRule As Long
    ID for default planting rule or rules that will be carried out if no planting rule is specified with a planting action.
ThinningRule As Long
    ID for default thinning rule or rules that will be carried out if no thinning rule is specified with a thinning action.
SelectiveCuttingRule As Long
    ID for default selective cutting rule or rules that will be carried out if no selective cutting rule is specified with a selective cutting action.
ClearCutRule As Long
    ID for default clear cut rule or rules that will be carried out if no clear cut rule is specified with a clear cut action.
Parameters As Object
    The set of growth parameters.
Methods
    SetTaper(Points as String)
        The set of taper points applied to tree classes within this stand.
Events
Remarks
- Trees are stored in the Stand object 58 as TreeClass objects 54 that specify the trees per acre for the different tree classes present. Species and DBH describe unique tree classes.

Table 8 illustrates properties, methods and events of Stands object 60. However, more or fewer properties, methods and events could also be used.

TABLE 8

Stands object 60
Description
Stands object 60 contains a list of stands. Stand objects 58 are accessed using an index.
Properties
    Add( ) As Stand
        Creates a new Stand object 58 and adds it to the list. Returns the Stand object 58 created.
    Area As Single
        The area of the stand.
    Count As Long
        Returns the number of Stand objects 58 in the list. Read only.
Methods
    Item(Index As Long) As Stand
        Returns the Stand object 58 at the Index position in the list.
    Item(Name As String) As Stand
        Returns the Stand object 58 with a given name.
Events
Remarks Table 9 illustrates properties, methods and events of Ownership object 62. However, more or fewer properties, methods and events could also be used.

TABLE 9

Ownership object 62
Description
Ownership object 62 contains a list of stands from Stands object 60. An ownership is the highest level of forest resource containment.
Properties
    Age as Long
        The average age of TreeClass objects 54 in stands. Read only.
    BA As Single
        The total basal area of TreeClass objects 54 in stands. Read only.
    DBH As Single
        The average DBH of TreeClass objects 54 in stands. Read only.
    Name As String
        User supplied name.
    Stands As Stands
        A list of stands in the ownership.
    TotalHeight As Single
        The average total height of TreeClass objects 54 in stands. Read only.

TABLE 9-continued

CFF As Single
        The average crown competition factor of TreeClass objects 54 in stands. Read only.
Methods
    TPA(MinDBH As Single, MaXDBH As Single) As Single
        The average TPA for TreeClass objects 54 in stands with minimum DBH MinDBH and maximum DBH less than MaxDBH.
Events
Remarks
- Access the Stand objects 58 through the Stands member.

Table 10 illustrates properties, methods and events of Organization object 64. However, more or fewer properties, methods and events could also be used.

TABLE 10

Organization object 64
Description
Organization object 64 corresponds to an organization that manages forested lands. The organization holds other objects related to ownership and management.
Properties
    Accountant As Accountant
        Tracks income and expenses as a simulation runs.
    ForestManager As ForestManager
        Coordinates the harvesting and planting of trees in stands. The Harvester, Planter, Cruiser, Scaler and Grader objects are assessed through the ForestManager.
    Name As String
        User supplied name.
    Ownership As Ownership
        Represents the extent of land ownership or land management by the organization. Ownership contains a list of stands that together make up the land that is owned or managed by the organization.
Methods
Events
Remarks
- Access Ownership object 62, ForestManager object and Accountant object through Organization object 64.
- The Organization object 64 contains an Ownership object 62, which in turn contains a list of Stand objects 60. Organization object 64 also includes a ForestManger and an Accountant object member. The ForestManager coordinates harvesting and planting activities on the ownership. The Accountant tracks the flow of income and expenses.

Forest Management Objects

Figure 6:
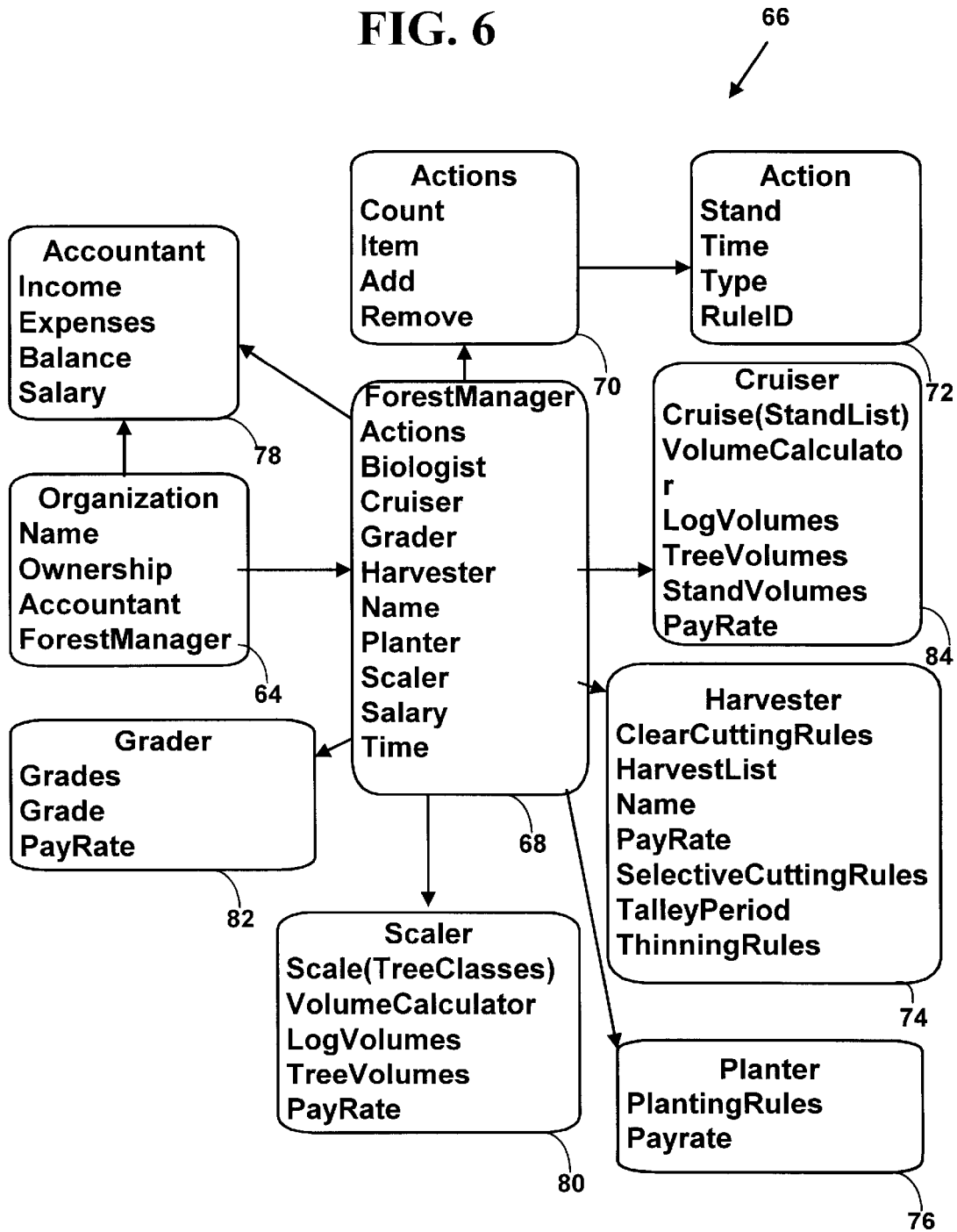
FIG. 6 is a block diagram illustrating Forest Management objects.

Coordinating the management of forestry operations is done using the Forest Management objects. FIG. 6 is a block diagram illustrating Forest Management objects 66. Forest Management objects 66 uses the description of multiple management actions in database 18 to create an object-oriented management model at step 26 of method 20 (FIG. 2). Forest Management objects coordinate management activities among a set of management objects. Forest Management objects 66 apply management actions to forest resources.

A ForestManager object is an employee of Organization object 64 that coordinates forest management among a number of other management objects including a Biologist, Cruiser, Grader, Harvester, Planter and Scalar object-oriented objects. The ForestManager object uses a list of actions that describe management tasks to be carried out on stands via the other management objects. The actions specify a year, stand, and action to be carried out (e.g., plant, clear cut, selective cut, etc.). As a management object performs an action, it "bills" the organization via the Accountant for its services. An Accountant object subtracts expenses from a budget. The timber in a stand is "sold"

according to its graded value with the sale going into the budget as income. Cash flow for Organization object 64 can be tracked during a simulation by sampling the Accountant object.

As is illustrated in FIG. 6, ForestManager object 68 uses an Actions object 70 and an Action object 72 with a list of management actions along with a list of management rules to carry out the management actions. Table 11 illustrates properties, methods and events of ForestManager object 68. However, more or fewer properties, methods and events could also be used.

TABLE 11

ForestManager 68
Description
ForestManager object 68 coordinates forest management activities among the management objects. Each management period ForestManager 68 loops through a list of management actions and instructs the other Forest Management objects 66 to carry out management actions if any are scheduled.
Properties
    Actions As Actions
        Holds a list of actions to be carried out during a simulation.
    Biologist As Biologist
        The Biologist object calculates habitat quality indices.
    Cruiser As Cruiser
        The Cruiser object calculates the timber volume present in stands.
    Grader As Grader
        The Grader object grades and values volumes.
    Harvester As Harvester
        The Harvester object harvests stands when the average age of trees in a stand exceeds the rotation age by deleting trees in the stand.
    IsAutoThin As Long
        Determines whether the auto thin method is turned on.
    Name As String
        User supplied name of object.
    Planter As Planter
        The Planter object plants trees in stands.
    Scaler As Scaler
        The Scaler calculates volumes in trees.
    Salary As Single
        The cost of ForestManager's services for one period. At the end of the period, the ForestManager's salary is billed to the organization.
    Time As Long
        Returns the current period for this ForestManager object.
Methods
Events
    ForestManagerAction(Action As Long, Stand As Stand)
        Triggered after the ForestManager object performs an action on a stand.
Remarks
    • Set up actions for the simulation using the ForestManager's object 68 Actions object.
    • Other member's of Forest Management objects 66 may carry out tasks independent of the scheduled actions at any time during a simulation. For example, Cruiser object 84 can be told calculate standing volume once a period from the scripting language independently of ForestManager object 68.

Table 12 illustrates properties methods and events of Actions object 70. However, more or fewer properties, methods and events could also be used.

TABLE 12

Actions object 70
Description
Actions object 70 contains a list of Action objects 72. Action objects 72 are accessed using an index.
Properties
    Count As Long
        Returns the number of Action objects 72 in the list. Read only.
Methods TABLE 12-continued Item(long Index) As Action
        Returns the Action object 72 at the Index position in the list.
    Add( ) As Action
        Creates a new Action object 72 and adds it to the list. Returns the Action object 70 created.
    RemoveAll(long index)
        Removes all Action object 72 from the list.
Events
Remarks Table 13 illustrates properties methods and events of Action object 72. However, more or fewer properties, methods and events could also be used.

TABLE 13

Action object 72
Description
Action object 72 specifies a forest management action to be performed, a stand to perform it on, a period at which it is performed and a rule that defines how it will be carried out. Action objects 72 are stored within the Actions object 70.
Properties
    Stand As Object
        Stand object 58 that the action is to be performed on.
    Time As Long
        The time at which the action is to be performed.
    Type As Long
        A number specifying the type of action to be performed.
        0 - Plant.
        1 - Thin.
        2 - Selective cut.
        3 - Clear cut.
    RuleID as Long
        A numeric Id identifying the rule to be used to carry out the action. This number equates to a rule object in the consultant who will carry out the action.
    RuleName as String
        A text description of the rule name
Methods
Events
Remarks
    • The rule used to carry out an action is defined in the appropriate consultant. For example, if a clear cut action contained a rule ID of 3, the ClearCutRule object with ID of 3 stored in the ClearcutRules object of the Harvester object is used.

Management plans are simulated by having ForestManager object 68 instruct a Harvester object 74 and a Planter object 76 to carry out management actions. Management actions specify the period, stand and action to be carried out and its associated rule.

Harvester object 74 carries out clear cuts, selective cuts or thinnings. If clear cut is used, all trees are removed from the stand. If selective cut is used, a graph of trees per acre to leave versus DBH class is used to determine the trees to cut. Thinnings can be based on DBH or crown ratio using from below, from above or even selection methods. After a harvest has occurred, the HarvestList member of the Harvester object 74 contains a list of harvested trees by stand.

Table 14 illustrates properties, methods and events of Harvester object 74. However, more or fewer properties, methods and events could also be used.

TABLE 14

Harvester object 74
Description
Harvester object 74 harvests timber in stands using either thinning, a clear cut or a selective cut method. If a selective cut is used, trees are removed until densities match a predefined size class distribution. The harvested trees can be accessed and scaled for volume by the Scaler object.
    Clear Cut
        If clear cut is selected, Harvester object 74 removes all trees in the stand being harvested.
    Selective Cut
        When selective cutting, Harvester object 74 removes trees until the stand TPA <= the TPA specified.
Properties
    ClearCuttingRules As ClearCuttingRules
        A ClearCuttingRules object that holds a set of ClearCuttingRule objects that defines how clear cutting is carried out.
    Name As String
        User supplied name of object.
    PayRate As Single
        Rate of pay for each stand harvested. Billed to organization after each harvest.
    SelectiveCuttingRules As SelectiveCuttingRules
        A SelectiveCuttingRules object that holds a set of SelectiveCuttingRule objects that define how selective cutting is carried out.
    TallyPeriod As Long
        Length of time Harvester will accumulate harvested trees into TreeClasses member before resetting TreeClasses to 0.
    ThinningRules As ThinningRules
        A ThinningRules object that holds a set of ThinningRule objects that defines how thinning is carried out. See ThinningRules.
    HarvestList As HarvestList
        A HarvestList object that holds the list of stands that were harvested in the current period.
Methods
    SetTPA(Points As String)
        A set of points with the format "DBH1, TPA1; DBH2, TPA2; . . " that specifies the trees per acre for DBH classes. The harvester compares the trees per acre in the stand and removes those tree classes that have more than that specified here. For DBH classes not specified, the Harvester linearity interpolates.
Events
    HarvesterPreHarvest(Stand As Stand)
        Triggered before a stand is harvested. The stand to be harvested is passed as a parameter.
    HarvesterPostHarvest(Stand As Stand)
        Triggered after a stand has been harvested. The stand harvested is passed as a parameter.
Remarks
- Harvester object 74 is internally instructed by the ForestManager 68 to harvest according to the actions specified in the Actions member of the ForestManager 68.
- The HarvesterPostHarvest event can be used to trigger Scaler object 80 to calculate the volume of the harvested trees.
- If selective harvesting is to occur, the SetTPA( ) member is called.
- After harvesting, the TreeClass objects 54 that were harvested are listed in the TreeClasses object 56. Each TreeClass object 54 in TreeClasses object 56 have their Count member set to the number of individuals of that tree class that were harvested and the TPA member set to 0.

Planter object 76 plants trees according to a list of saplings. Saplings are TreeClass objects 54 that are inserted into Stand objects 58 at a time of simulated planting.

Table 15 illustrates properties, methods and events of Planter object 76. However, more or fewer properties, methods and events could also be used.

TABLE 15

Planter object 76
Description
Planter object 76 plants trees according to its list of saplings.
Properties
    Name As String
        User supplied name.
    PlantingRules As PlantingRules
        A PlantingRules object that holds a list of PlantingRule objects which define how planting is carried out
Methods
Events
    PlanterPrePlant(Stand As Stand)
        Triggered before a stand is planted. The stand to be planted is passed as a parameter.
    PlanterPostPlant(Stand As Stand)
        Triggered after a stand is planted. The stand planted is passed as a parameter.
Remarks
- Planter object 76 is internally instructed by ForestManager object 68 to plant stands according to the actions set up for the simulation.
- Set up the tree to the planted using the Saplings member. tree classes re planting when this rule is carried out.

Cash flow is tracked through the use of an Accountant object 78. Both the ForestManager object 68 and Accountant object 78 are "employees" of Organization object 64 (FIG. 5). Their costs are accounted for as a fixed salary each period.

Table 16 illustrates properties, methods and events of Accountant object 78. However, more or fewer properties, methods and events could also be used.

TABLE 15

Accountant object 78
Description
Accountant object 78 tracks cash flow during a simulation. Organization wide income and expenses are accessed through object members.
    Opening the Books
When the books are opened, income and Expense are set to 0.
    Closing the Books
When the books are closed, fixed costs and the Accountant object's 78 salary are added to Expense. NetPresentValue and the InternalRateOfReturn are also calculated.
Properties
    Balance As Single
        Tracks the balance during an entire simulation.
    Expense As Single
        Tracks the expenses for they year. Transferred to the balance when the books are closed. Zero at the beginning of the year.
    FixedCostsPerArea As Single
        Operation expense incurred on a per area basis. Transferred to the balance when the books are closed.
    FixedCostsPerPeriod As Single
        Operation expense incurred on a per simulation period basis. Transferred to the balance when the books are closed.
    FixedCostsPerStand As Single
        Operation expense incurred on a per Stand basis. Transferred to the balance when the books are closed.
    Income As Single
        Tracks the income for they year. Transferred to the balance when the books are closed. Zero at the beginning of the year.
    InitialExpense As Single
        Operation expense that is incurred once at the beginning of a simulation.
    InternalRateOfReturn As Single
        The internal rate of return that is calculated as a result of the management of forest resources.
    MinimumAcceptableRate As Single
        The minimum acceptable rate of return used to calculate the internal rate of return.
    Name As Single

TABLE 15-continued

Name of the accountant object.
NetPresentValue As Single
    the net present value calculated as a result of the
    management of forest resources.
Salary As Single
    The cost of Accountant's services for one year. At the
    end of the year, the Accountant's salary is billed to the
    organization.
Time As Single
    Simulation time.
Methods
Events
    AccountantBeforeOpenBooks
        Triggered just before the books are opened.
    AccountantAfterOpenBooks
        Triggered just after the books are opened.
    AccountantBeforeCloseBooks
        Triggered just before the books are closed.
    AccountantAfterCloseBooks
        Triggered just after the books are closed.
Remarks
- Add any external expenses to the Expense member before the books are closed so that they will be included in NPV and IRR cash flow calculations.

Harvested trees can be scaled using a Scaler object 80 then graded using a Grader object 82. The resulting value can be added to the organization's income using Accountant object 78.

Table 17 illustrates properties, methods and events of Scaler object 80. However, more or fewer properties, methods and events could also be used.

TABLE 17

Scaler object 80
Description
Scaler object 80 calculates the volumes in trees.
Properties
    IsTallyLogVolumes As Long
        The VolumeCalculator can tally volume into log classes.
        1 - Tally volumes into log classes. Log volumes are accessed through the LogVolumes object.
        0 - Don't tally volumes into log classes. The Log volumes object will be empty.
    IsTallyTreeVolumes As Long
        The VolumeCalculator can tally volume into tree classes.
        1 - Tally volumes into tree classes. Tree volumes are accessed through the TreeVolumes object.
        0 - Don't tally volumes into tree classes. The TreeVolumes object will be empty.
    LogVolumes As LogVolumes
        Holds timber volume tallied by log classes. Species, diameter and length determine unique log classes. This object will be empty unless IsTallyLogVolumes is set to true.
    MinDBH As Single
        A minimum DBH used to determine which tree classes contribute volume to volume tallies.
    Name As String
        User supplied name.
    PayRate As Single
        Rate of pay for each TreeClasses object scaled. Billed to organization.
    TreeVolumes As TreeVolumes
        Holds timber volume tallied by tree classes. Species and DBH determine unique tree classes. This object will be empty unless IsTallyTreeVolumes is set to true.
    VolumeCalculator As VolumeCalculator
        Calculates volume and tallies it into log and tree classes.
    TallyMode as Long
        Determines whether volume tallies are averaged each call the Scale( ). If TallyMode = 0, volume tallies are averaged each call the Scale( ). If TallyMode = 1, averaging does not occur. The Average( ) method should be called manually to average the tallies.
Methods

TABLE 17-continued

Scale(TreeClasses As TreeClasses)
        Instructs the Scaler to scale the TreeClasses given. The resulting volumes calculated from the scale is accessed through the VolumeCalculator object.
    Average( )
        Instructs the Scaler to average the volume tallies
    Clear( )
        Instructs the Scaler to clear the volume tallies.
Events
Remarks
- Scale trees by calling the Scale( ) member, passing a TreeClasses object 54. Then access the resulting volume through the LogVolumes object or TreeVolumes objects in the Scaler's object 80 VolumeCalculator object.
- The LogVolumes object can be given to Grader object 82 for grading and calculating the value of the volume.
- The Scaler object 80 calculates the volume of individual trees. Therefore, the Count member of the TreeClass object 54 is used in calculations rather than the TPA member.
- Access Scaler object 80 through ForestManager object 68

Table 18 illustrates properties, methods and events of Grader object 82. However, more or fewer properties, methods and events could also be used.

TABLE 18

Grader object 82
Description
Grader object 82 grades and values timber volume. Grader object 82 takes the log volumes in a LogVolumes object and sorts the volume into grade classes that are described in the Grader's Grades object. The grading process fills in the value and volume fields of Grades object.
Properties
    Grades As Grades
        A Grades object that is used to both set up grades and to obtain the volume and value of timber after grading has occurred. Grades are entered into the Grades object in order of decreasing value.
    Name As String
        User supplied name of Grader.
    PayRate As Single
        Rate of pay for each LogVolumes object graded. Billed to organization after each grading.
Methods
    Grade(LogVolumes As LogVolumes)
        Grades the volume passed as a parameter and returns the resulting grades. The volume and value of each Grade object in the Grades object can be sampled after the function returns.
Events
Remarks
- First create a set of grades using the Grades member of the Grader object. Call Grade( ) passing the LogVolumes object to be graded. The LogVolumes object can be created using either the Cruiser or Scaler objects. Each LogVolume object in the LogVolumes object is compared to each Grade object in the Grades object. Grades are compared from the first Grade object in the list to the last Grade object in the Grades object. The first Grade object that matches the LogVolume object is used as the grade for that volume. The total value for the grade is incremented using the Grade's rate value and the LogVolume's board foot value. If a LogVolume object does not match any Grade objects, it does not contribute to grade volume or value. The Grade object's NumberUngraded tracks the number of LogVolume objects with no matching grades. When the Grade( ) function returns, the Grades object can be sampled for the result.
- The resulting graded volume is accessed through the Grades object.
- Grader's object 82 list of grades should be set up prior to grading. They should be entered into Grades object in order of decreasing value.

Cruiser object 84 calculates stand volume by "cruising" one or more stands. The tallies can be by stand, tree class or log. Cruiser object 84 is used to do volume calculations and can be configured for a number of board feet and cubic feet measures.

Table 19 illustrates properties, methods and events of Cruiser object 84. However, more or fewer properties, methods and events could also be used.

TABLE 19

Cruiser object 84
Description
Cruiser object 84 calculates the volume of standing trees. Volumes for any number of stands can be calculated. Volume can be summarized by stand, tree class and log class. The stands past to the Cruise( ) method and minimum DBH setting determines the trees whose volume is calculated. Volume is calculated using the VolumeCalculator object that contains settings for determining how volume is summarized. Once volume is calculated, it is returned through the StandVolumes, TreeVolumes and LogVolumes classes.
Properties
    IsTallyLogVolumes As Long
        The VolumeCalculator can tally volume into log classes.
        1 - Tally volumes into log classes. Log volumes are accessed through the LogVolumes object.
        0 - Don't tally volumes into log classes. The LogVolumes object will be empty.
    IsTallyTreeVolumes As Long
    The VolumeCalculator can tally volume into tree classes.
    1 - Tally volumes into tree classes. Tree volumes are accessed through the TreeVolumes object.
    0 - Don't tally volumes into tree classes. The TreeVolumes object will be empty.
    IsTallyStandVolumes As Long
        The VolumeCalculator can tally volume by stand.
        1 - Tally volumes by stand. Stand volumes are accessed through the StandVolumes object.
        0 - Don't tally volumes by stand. The StandVolumes object will be empty.
    Name As String
        User supplied name of object.
    MinDBH As Single
        A minimum DBH used to determine which tree classes contribute volume to volume tallies.
    PayRate As Single
        Rate of pay for each stand cruised. Billed to organization.
    VolumeCalculator As VolumeCalculator
        Calculates volume and tallies it into log and tree classes.
    LogVolumes As LogVolumes
        Holds timber volume tallied by log classes. Species, diameter and length determine unique log classes. Set IsTallyLogVolumes to true end call the Cruise( ) method to fill the LogVolumes object.
    TreeVolumes As TreeVolumes
        Holds timber volume tallied by tree classes. Species and DBH determine unique tree classes. Set IsTallyTreeVolumes to true and call the Cruise( ) method to fill the TreeVolumes object.
    StandVolumes As StandVolumes
        Holds timber volume tallied by stand. Set IsTallyStandVolumes to true and call the Cruise( ) method to fill the StandVolumes object.
Methods
    Cruise(StandList As String)
        Instructs the cruiser to cruise the list of stands given. Format for StandList is "Stand1; Stand2; . . . " where "Stand1", etc. is the name of individual stands to be cruised. The resulting volumes calculated from the scale is accessed through the VolumeCalculator object.
Events
Remarks
  •  Cruise stands by calling the Cruise( ) member, passing a list of stands. Then access the resulting volume through the StandVolumes, TreeVolumes or LogVolumes objects. Remember to set which volume summaries will be valid using the IsTallyStandVolumes, IsTallyTreeVolumes and IsTallyLogVolumes properties.
  •  The LogVolumes object can be given to Grader object 82 for grading.

Rule Objects

FIG. 7 is a block diagram illustrating Rule objects 86. Rule objects 86 define how the multiple management actions are carried out. Each management action has a rule associated with it that defines how the management action will be carried out. ClearcuttingRules object 88, ClearcuttingRule object 90, SelectiveCuttingRules object 92, SelectiveCuttingRule object 94 and ThinningRules object 96 and ThinningRule object 98 are stored in Harvester object 74.

Table 20 illustrates properties, methods and events of ClearcuttingRules object 88. However, more or fewer properties, methods and events could also be used.

TABLE 20

ClearCuttingRules object 88
Description
ClearCuttingRules object 88 implements a list of ClearCuttingRule objects 90. ClearCuttingRules object 88 is accessed through Harvester object 74.
Properties
    Count As Long
        Returns the number of ClearCuttingRule objects 90 in the list.
Methods
    Add( ) As ClearCuttingRule
        Creates a new ClearCuttingRule object 90 and adds it to the list. Returns the ClearCuttingRule object 90 created.
    Item(Index As Long) As ClearCuttingRule
        Returns the ClearCuttingRule object 90 at the Index position in the list.
    RemoveAll( )
        Removes all ClearCuttingRule objects 90 from the list.
Events
Remarks Table 21 illustrates properties, methods and events of ClearcuttingRule object 90. However, more or fewer properties, methods and events could also be used.

TABLE 21

ClearCuttingRule object 90
Description
ClearCuttingRule object 90 is a rule that defines how a clear cut action will be carried out. Clear cutting rules differ only by their cost, which is accounted for each time the rule is carried out. ClearCuttingRule objects 90 are stored in the ClearCuttingRules object 88 which is accessed through
Harvester object 74.
Properties
    Cost As Single
        Cost per acre for a clear cut action. Cost of clear cut is accounted for at the time of each clear cut action.
    Name As String
        Name of this clear cut rule.
    ID As Long
        Numeric ID uniquely identifying this clear cutting rule from other clear cutting rules.
Methods
Events
Remarks Table 22 illustrates properties methods and events of SelectivecuttingRules object 92. However, more or fewer properties, methods and events could also be used.

TABLE 22

SelectiveCuttingRules 92
Description
SelectiveCuttingRules object 92 holds a list of SelectiveCuttingRule objects 94.
Properties
    Count As Long
        Returns the number of SelectiveCuttingRule objects 94 in the list.
Methods
    Add( ) As SelectiveCuttingRule
        Creates a new SelectiveCuttingRule object 94 and adds it to the list. Returns the SelectiveCuttingRule object 94 created.
    Item(Index As Long) As SelectiveCuttingRule
        Returns the SelectiveCuttingRule object 94 at the index position in the list.

TABLE 22-continued

RemoveAll( )
    Removes all SelectiveCuttingRule objects 94 from the list.
Events
Remarks Table 23 illustrates properties, methods and events of SelectivecuttingRule object 94. However, more or fewer properties, methods and events could also be used.

TABLE 23

SelectiveCuttingRule 94
Description
SelectiveCuttingRule object 94 is a rule that defines how a selective cutting action will be carried out. When selective cutting occurs, a size density curve is used to define the TPA of trees to leave standing. The size density curve is set by calling the SetTPA( ) method.
Properties
    Cost As Single
        Cost per selective cutting action carried out.
    Name As String
        Name of this selective cutting rule.
    ID As Long
        Numeric ID uniquely identifying this selective cutting rule from other selective cutting rules.
Methods
    SetTPA(Points as String)
        Sets the minimum TPA curve
Events
Remarks Table 24 illustrates properties methods and events of ThinningRules object 96. However, more or fewer properties, methods and events could also be used.

TABLE 24

ThinningRules object 96
Description
ThinningRules object 96 holds a list of ThinningRule objects 98.
Properties
    Count As Long
        Returns the number of ThinningRule objects 98 in the list.
Methods
    Add( ) As ThinningRule
        Creates a new ThinningRule object 98 and adds it to the list.
        Returns the ThinningRule object 98 created.
    Item(Index As Long) As ThinningRule
        Returns the ThinningRule object 98 at the Index position in the list.
    RemoveAll( )
        Removes all ThinningRule objects 98 from the list.
Events
Remarks Table 25 illustrates properties, methods and events of ThinningRule object 98. However, more or fewer properties, methods and events could also be used.

TABLE 25

ThinningRule object 98

Description

ThinningRule object 98 is a rule that defines how a thinning action will be carried out.
Properties Cost As Single
  Cost per thinning action carried out.
Name As String
  Name of this thinning rule.

TABLE 25-continued

ThinningRule object 98

Method As Long
  Thinning method.
TriggerType As Long
  Type of thinning trigger.
Triggervalue As Single
  Value of thinning trigger.
TargetType As Long
  Name of this thinning rule.
TargetValue As Single
  Value of thinning target.
MinimumMarker As Single
  Minimum value for thinning marker.
MaximumMarker As Single
  Maximum value for thinning marker.
MarkerType As Long
  Type of thinning marker.
Name As String
  Name of this thinning rule.
ID As Long Numeric ID uniquely identifying this thinning rule from other thinning rules.
Methods SetTPA(Points as String)
  Sets the minimum TPA curve
Events
Remarks PlantingRules object 100 and PlantingRules object 102 are stored in Planter object 76. When Harvester object 74 or Planter object 76 is told to carry out an action, it looks up the rule associated with that action in its list. Any number of rules can be made for each action.

Table 26 illustrates properties, methods and events of PlantingRules object 100. However, more or fewer properties, methods and events could also be used.

TABLE 26

PlantingRules object 100

Description
PlantingRules object 100 holds a list of PlantingRule objects 102.
Properties Count As Long
  Returns the number of PlantingRule objects 102 in the list.
Methods
Add( ) As PlantingRule Creates a new PlantingRule object 102 and adds
  it to the list. Returns the
  PlantingRule object 102 created.
Item(Index As Long) As PlantingRule
  Returns the PlantingRule object 1 02 at the Index position in the list.
RemoveAll()
  Removes all PlantingRule objects 102 from the list.
Events
Remarks Table 27 illustrates properties, methods and events of PlantingRule object 102. However, more or fewer properties, methods and events could also be used.

TABLE 27

PlantingRule object 102

Desription
PlantingRules object 102 is a rule that defines how a planting action
will be carried out.
Properties Cost As Single
   Cost per planting action carried out.
Name As String
   Name of this planting rule.
ID As Long Numeric ID uniquely identifying this planting
   rule from all other planting rules
Saplings As TreeClasses object 56

TreeClasses object 56 that defines what tree classes
   are planted when this rule is carried out.
Methods
Events Rules can also be specified by stand. Each Stand object 58 can have a default rule for each action associated with it. When no rule is specified for an action, the default rule for the stand applies. In addition to scheduled thinnings, the ForestManager object 68 assesses the density of stands each period to determine if a thinning is needed. If so, the Harvester object 74 is instructed to thin the stand using a default thinning rule for the stand.

Timber Assessment Objects

Figure 8A:
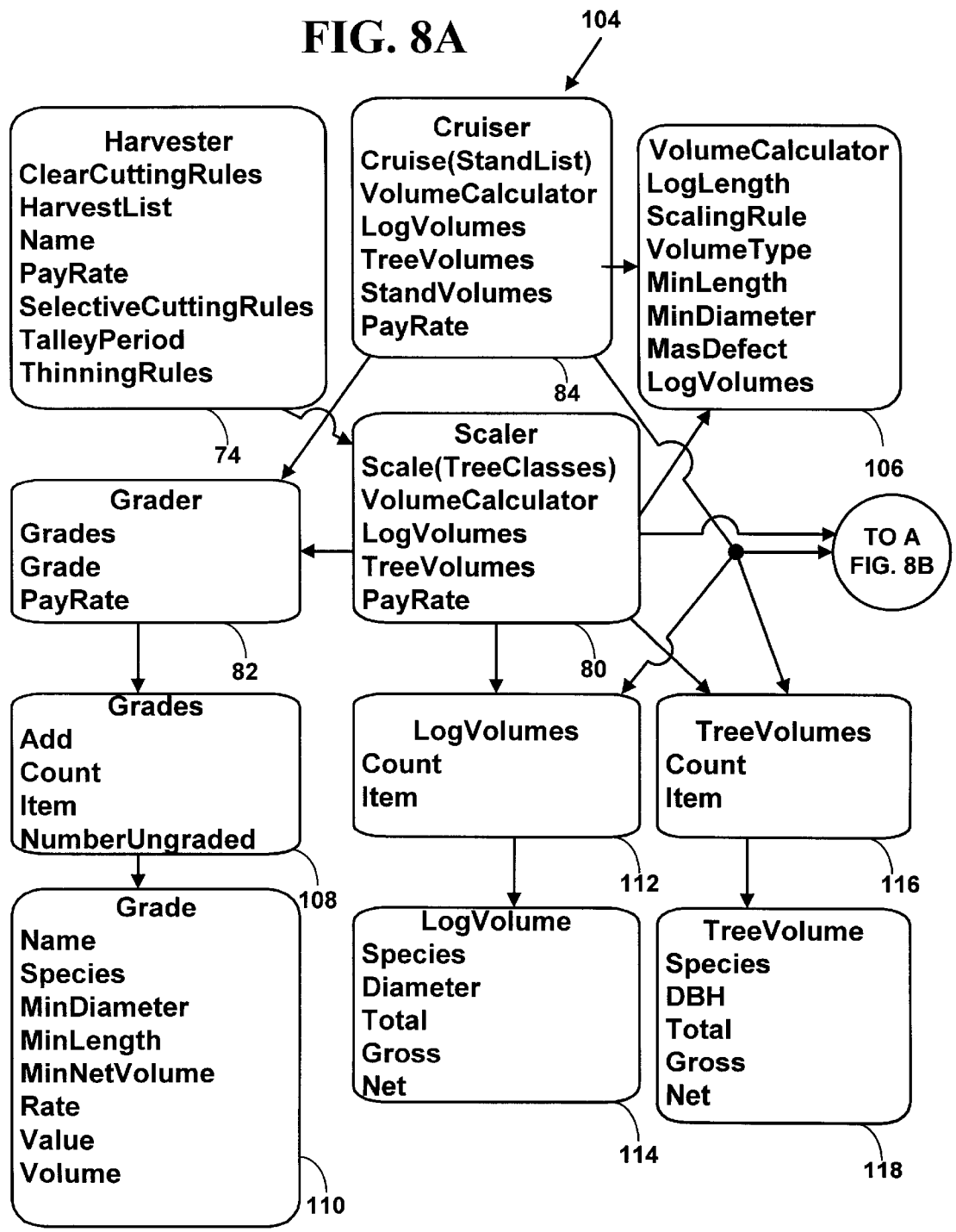
FIGS. 8A and 8B are a block diagram illustrating Timer Assessment objects.
Figure 8B:
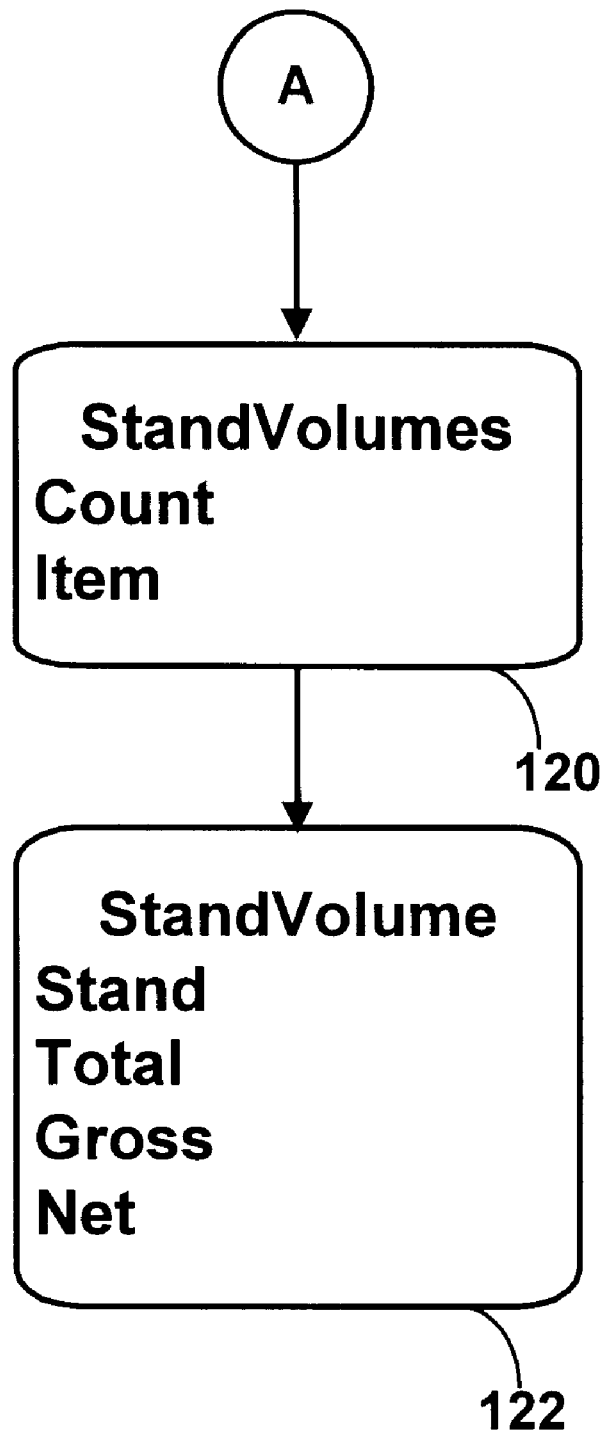

FIGS. 8A and 8B are a block diagram illustrating Timber Assessment objects 104. Timber Assessment objects 104 provide functionality for measuring the volume and value of timber. Cruiser object 84 calculates stand volume by "cruising" one or more stands using a VolumeCalculator object 106 in FIG. 8A. Cruising and volume calculation is known to those skilled in the forestry arts. Volume is tallied by stand, tree class or log class. Cruiser object's 64 VolumeCalculator object 106 is used to do the volume calculations and can be configured for a number of board feet and cubic feet measures.

Table 28 illustrates properties, methods and events of VolumeCalculator object 106. However, more or fewer properties, methods and events could also be used.

TABLE 28

VolumeCalculator object 106.

Description

VolumeCalculator object 106 calculates the timber volume of trees.
Volume is calculated in cubic and board foot values.
Board foot values are calculated using Scribner Decimal C log rules (e.g.,
Bell, 1988). Cubic foot volume is calculated as a truncated cope
(e.g., Bell, 1988). A minimum DBH for merchantable trees,
a minimum log diameter for merchantable logs and the log length
can be set to customize volume calculations. Log scaling can be
done using either Eastside (rounding) or Westside (truncation)
scaling rules. The VolumeCalculator calculates the volume of
trees one at a time. These volumes are tallied in LogVolumes
and TreeVolumes objects. The volume calculation for each tree
can be traced by catching the VolumeCalculatorPostCalc
event. This event passes the last TreeClass whose volume was
calculated and the number individuals trees it represents.
Properties IsCalcEvent As Long Determines whether the VolumeCalculatorCalc event
   is raised for the next tree class
   calculated.

TABLE 28-continued

VolumeCalculator object 106.

LogLength As Single
   Length of log to be used in segmenting a tree.
Logvolumes As LogVolumes A LogVolumes object that holds the Logvolume objects
   for the last calculated tree
   class.
MaxDefect As Single Maximum defect aflowed for log to contribute volume
   to net volume tally.
MaxNetVolume As Single Minimum net volume of log for log to contribute
   volume to net volume tally.
MinDiameter As Single Minimum log diameter for log to contribute
   volume to gross volume tally.
MinLength As Single Minimum log length for log to contribute
   volume to gross volume tally.
VolumeType As Long
   Type of volume to calculate.
ScalingRule As Long Scaling rule to be used in volume calculations.
   1- Westside scaling rules. Log diameters are truncated to
   the nearest inch.
   2- Eastside scaling rules. Log diameters are rounded to the nearest inch.
Events
VolumeCalculatorpreCalc(TreeClass As TreeClass, TreeCount As Double)

Triggered before the VolumeCalculator calculates
   the volume of a tree.
VolumeCalculatorPostCalc(TreeClass As Treeclass,
TreeCount As Double)

Triggered after the VolumeCalculator calculates the
   volume of a tree. Sample the
   CurrentLogVolumes member to determine the volume
   of each log in the TreeClass given.
Remarks

• VolumeCalculator object 106 is an object member
  of both Cruiser object 84 and
  Scaler object 80 Prior to instructing Cruiser object
  84 or Scaler object 80 to calculate
  volume, the LogLength, MinDBH, MinLogDiameter
  and ScalingRule properties of
  their respective VolumeCalculators are set.
• Cruiser object 84 and Scaler object 80 are told what types of categories
  VolumeCalculator object 106 is to tally volume into: tree classes,
  log classes or both.

After Harvester object 74 harvest trees, Scaler object 80 calculates the volume of timber in the harvested trees using a traditional volume calculations known to those skilled in the forestry arts. Scaler object 80 determines harvested volume using VolumeCalculator object 106 with a HarvestedTreeClasses object member from a HarvestList object member generated by Harvester object 74 after a harvest. Scaler object's 80 VolumeCalculator object 106 can be configured the same way as the Cruiser object's 84 VolumeCalculator object 106.

Grader object 82 calculates the value of timber volumes using a traditional log grading system known to those skilled in the forestry arts. Grader object 82 grades harvested timber using LogVolumes object 112 of the Scaler object 80 with Grades object 108 and Grade object 110. The resulting list of grades returns the volume and value of the harvested timber by grade. The value can be added to the organization's income using Accountant object 78.

Table 29 illustrates properties, methods and events of Grades object 108. However, more or fewer properties, methods and events could also be used.

TABLE 29

Grades object 108

Description

Grades object 108 implements a list of Grade objects 110.
Grader object 82 uses Grades object
108 to grade log volumes. Grades should be entered
in order of decreasing value.
Properties Count As Long
   Returns the number of Grade objects 110 in the list.
NumberUngraded As Long Returns the number of LogVolume objects that did
   not match any Grade objects 110
   during grading. LogVolume objects that remain
   ungraded do not contributed to grade
   volume or value.
Volume As Single Returns the volume of Grade objects 110 in the list.
   This will only be valid after a
   grading has occurred.
Value As Single Returns the value of Grade objects 110 in the list.
   This will only be valid after a
   grading has occurred.
Methods
Add( ) As Grade Creates a new Grade object 110 and adds it to the list.
   Returns the Grade object 110 created.
Item(Index As Long) As Grade Returns the Grade object 110 at the
   Index position in the list.
RemoveAll()
Removes Grade objects 110 from the list.
Events
Remarks

• Grader object 82 attempts to match Grade object 110
  from the first in the list to the
  last. The first Grade object whose specifications
  match the LogVolume object in
  question is used to assign a grade to the LogVolume object.
  Therefore, that Grade
  objects 110 are entered in decreasing value with the first
  entered having the highest
  value and the last entered having the lowest value.

Table 30 illustrates properties, methods and events of Grade object 110. However, more or fewer properties, methods and events could also be used.

TABLE 30

Grade object 110

Description

Grade object 110 holds grade specifications that are
used to implement log grading. Using grades, timber
value can be assessed.
Properties
MaxDefect As Single The maximum defect that a log may have to
   contribute volume to this grade.

TABLE 30-continued

Grade object 110

MinDiameter As Long

The minimum diameter that a log should have to
   contribute volume to this grade.
MinLength As Long The minimum length that a log should have to contribute
   volume to this grade.
MinNetVolume As Single The minimum net volume a log should have to contribute
   volume to this grade.
Name As String
   The name of the grade.
Rate As Single Value per unit volume for this grade. After Grader object
   82 calculates grades, the value of a grade becomes
   the volume of the grade multiplied by the rate.
Species As String
   Species object for this grade.
Value As Single
   Value for the volume in this grade.
Volume As Single
   The volume of timber in this grade.
Methods
Events
Remarks

• A grade is uniquely defined by its name, species,
  minimum diameter and minimum
  length specifications.

The volume of wood present in logs is determined by Scaler object 80 and Cruiser object 84 using a VolumeCalculator object 106 with a LogVolumes object 116 including a LogVolume object 118.

Table 31 illustrates, properties methods and events of LogVolumes object 112.

TABLE 31

LogVolumes object 112

Description

LogVolumes 112 object holds a list of LogVolume objects 114.
An index is used to access
objects in the list.
Properties NetAsSingle
   Net volume.
Count As Long
   The number of Logvolume objects 114 in the list.
Gross As Single
   Gross volume.
Total As Single
   Total volume.
Methods Item(Index As Long) As LogVolume
   Returns the LogVolume object 114 with the index given
Events
Remarks Table 32 illustrates properties, methods and events of LogVolume object 114. However, more or fewer properties, methods and events could also be used.

TABLE 32

LogVolume object 114

Description

LogVolume object 114 holds the volume of timber tallied into log classes. Species, diameter and length uniquely define log classes. Volume is available in cubic and board foot values. Board foot values is calculated using Scribner Decimal C log rules. (e.g., Bell, 1988) Cubic foot volume is calculated as a truncated cone.
Properties Diameter As Long
   Diameter of this log volume class.
Gross As Single
   Gross volume.
Length As Long
   Length of this log volume class.
NetAsSingle
   Net volume.
Species As String
   Species of this log volume class.
Total As Single
   Total volume.
Methods
Events
Remarks The volume of wood present in trees is determined by Scaler object 80 and Cruiser object 84 using a VolumeCalculator object 106 with a TreeVolumes object 116 including a TreeVolume object 118. Table 33 illustrates properties, methods and events of TreeVolumes object 116. However, more or fewer properties, methods and events could also be used.

TABLE 33

TreeVolumes object 116

Description

TreeVolumes object 116 holds a list of TreeVolume objects 118. An index is used to access objects in the list.
Properties Age As Single
   Average age of tree classes. Read only.
BA As Single If TreeVolume objects 118 are derived from Cruiser calculations, the BA is BA per 110 acre. If TreeVolume objects 118 are a result of Scaler calculations, then BA is total BA for trees harvested. Read only.
Count As Long
   The number of TreeVolume objects 118 in the list. Read only.
DBH As Single
   Returns the arithmetic average DBH of TreeVolume objects 118 in the list. Read only.
Gross As Single
   Gross volume. Read only.
Net As Single
   Net volume. Read only.
Total As Single
   Total volume. Read only.
HeightTotal As Single
   Average total height. Read only.
Sort(Type as Long)

Sorts the list of TreeVolumes objects 116. Type interpreted as a bit filed where bit 1 sorts by species and bit 2 sorts by DBH. Sorting order parallels bit order.

TABLE 33-continued

TreeVolumes object 116

TPA As Single

Trees per acre. Invalid if TreeVolumes object 116 when derived from Scaler object 80. Read only.
TreeCount As Single Trees per acre. Valid if TreeVolumes object 116 when derived from Scaler object 80. Read only.
QMD As Single Returns the quadratic mean diameter or the DBH of a tree with average BA. Read only.
Methods Item(Index As Long) As StandVolume
   Returns StandVolume object with the index given.
Events
Remarks Table 34 illustrates properties, methods and events of TreeVolume object 118. However, more or fewer properties, methods and events could also be used.

TABLE 34

TreeVolume object 118

Description

TreeVolume object 118 holds the volume of timber tallied by stand. Species and DBH uniquely define TreeVolume objects 118 within Treevolumes object 116.
Properties Age As Single
   Average age of tree classes.
BA As Single
   Average BA per acre.
DBH As Single
   DBH.
Gross As Single
   Gross volume.
Net As Single
   Net volume.
Species As String
   Species.
Total As Single
   Total volume.
HeightTotal As Single
   Average total height.
TPA As Single Trees per acre. Invalid if TreeVolume object 118 when derived from Scaler object 80.
TreeCount As Single
   Trees per acre. Valid if TreeVolume object 118 when derived from Scaler object 80.
Methods
Events
Remarks The volume of timber present in a stand is determined by Cruiser object 84 using a VolumeCalculator object 106 with a StandVolumes object 120 including a StandVolume object 122 (FIG. 8B).

Table 35 illustrates properties, methods and events of StandVolumes object 120. However, more or fewer properties, methods and events could also be used.

TABLE 35

StandVolumes 120

Description

StandVolumes object 120 holds a list of StandVolume objects 122.
An index is used to access objects in the list.
Properties Age As Single
   Average age of tree classes. Read only.
BA As Single
   Average BA per acre. Read only.
Count As Long
   The number of StandVolume objects 122 in the list. Read only.
Gross As Single
   Gross volume. Read only.
Net As Single
   Net volume. Read only.
Total As Single
   Total volume. Read only.
TotalHeight As Single
   Average total height. Read only.
TPA As Single
   Trees per acre. Read only.
Methods Item(Index As Long) As StandVolume
   Returns StandVolume object 122 with the index given.
Events
Remarks Table 36 illustrates properties, methods and events of StandVolume object 122. However, more or fewer properties, methods and events could also be used.

TABLE 36

StandVolume object 122

Description

Figure 9:
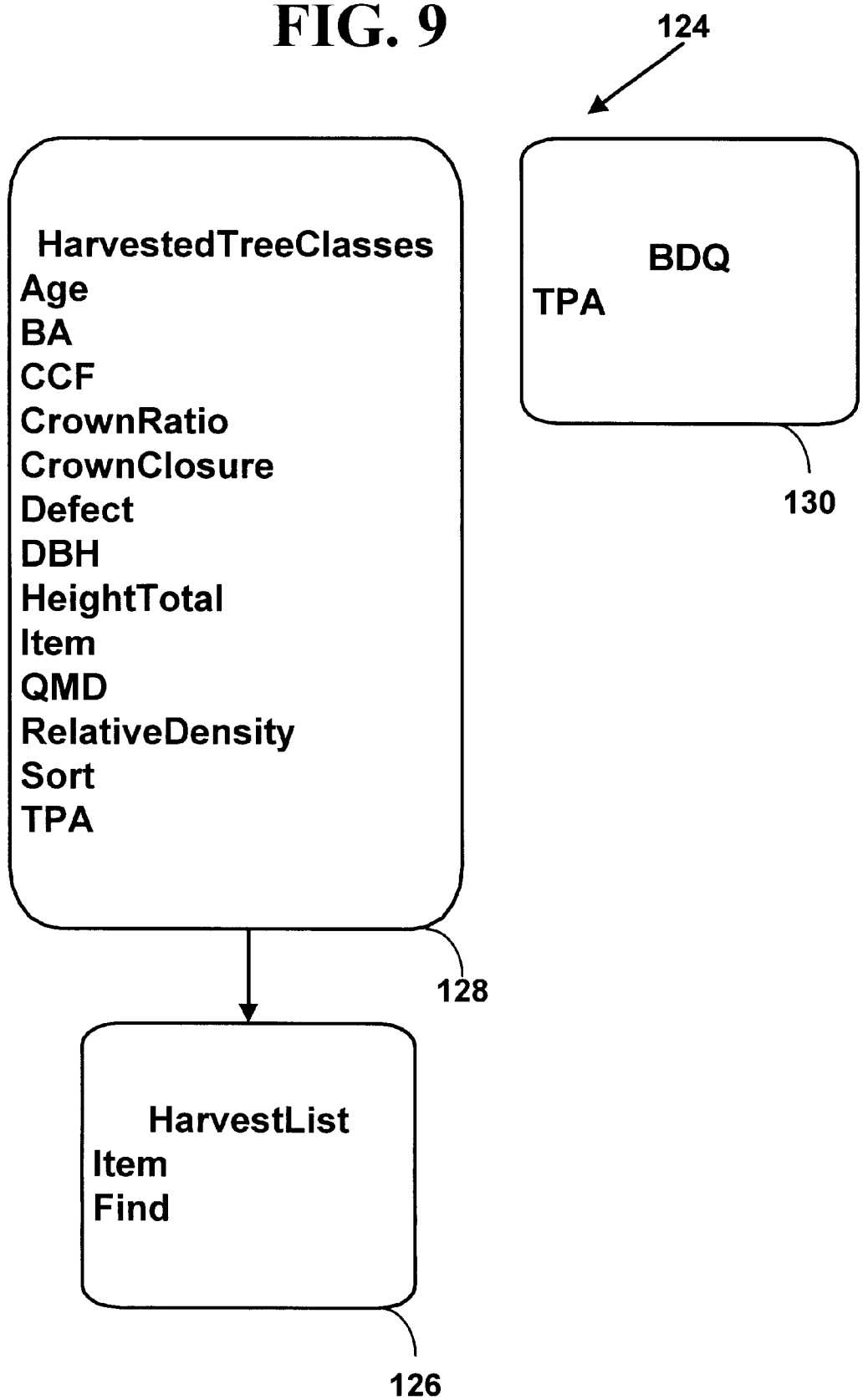
FIG. 9 is a block diagram illustrating additional Forest Simulation objects.

StandVolume object 122 holds the volume of timber tallied by stand.
Stand name uniquely define
StandVolume objects 122 within the StandVolumes object 120.
Properties Age As Single
   Average age of tree classes. Read only.
BA As Single
   BA per acre. Read only.
Gross As Single
   Gross volume. Read only.
Net As Single
   Net volume. Read only.
Stand As String
   Name of stand this StandVolume object
122 represents. Read only.
Total As Single
   Total volume. Read only.
TotalHeight As Single
   Average total height. Read only.
TPA As Single
   Trees per acre. Read only.
QMD As Single Quadratic mean diameter or the DBH of
   a tree with average BA. Read only.
Methods
Events
Remarks FIG. 9 is a block diagram 124 illustrating additional Forest Simulation objects including a HarvestList object 126, HarvestedTreeClass object 128, and a BDQ object 130. Harvester 74 uses HarvestList object 126 and HarvestedTreeClasses object 128 to summarize harvested by stand after a harvest. HarvestList object 126 includes a list of HarvestedTreeClasses objects 128 in a list. HarvestedTreeClasses object 128 includes a list of harvested TreeClass objects 54. BDQ object 130 provides a TPA versus DBH for a set of TreeClass objects 54.

Table 37 illustrates properties, methods and events of HarvestList object 126. However, more or fewer properties, methods and events could also be used.

TABLE 37

HarvestList object 126

Description

List of HaverstedTreeClasses objects 128 in the harvest list.
Properties

CountAsLong
   Returns the number of HarvestedTreeClasses
   objects 128 in the harvest list.
Methods Item(Index as Long) As HarvestedTreeClasses
   Returns the HarvestedTreeClasses object 128 with the index given.
Find(Stand as String) As HarvestedTreeClasses
   Returns the HarvestedTreeClasses object 128
   that corresponds to the stand given.
Events
Remarks Table 38 illustrates properties, methods and events of HarvestedTreeClasses object 128. However, more or fewer properties, methods and events could also be used.

TABLE 38

HarvestedTreeClasses object 128

Description

List of harvested TreeClasses objects 56.
Properties

Count As Long
   Returns the number of TreeClasses objects 56 in the list.
Stand As String Returns the name of the stand to which this
   HarvestedTreeClasses object 128
   corresponds
Methods Age as Long
   Average age of tree class objects in the list.
BA As Single
   Sum of basal area for tree class objects in the list.
CCF(DBH) As Single Crown competition factor for trees with DBH larger than
   that given (e.g., Krajicek et. al., 1961). Calculated as:
      $CCF = \Sigma(CW_i^2 * TPA) * \pi/4/43560$
   Where i denotes the $i^{th}$ tree class object in the
   list with DBH larger than MinDBH
CrownRatio() As Single
   Average crown ratio weighted by TreeCount.
CrownClosure(DBH) As Single
   Crown competition factor for trees with HeightTotal > Height.
   Calculated similarly as CCF.
Defect As Single
   Returns the % defect for tree class object in the list.
DBH As Single
   Returns the arithmetic average DBH of tree class objects in the list.
HeightTotal As Single
   Average total height of tree class objects in the list.
Item(Index As Long) As Object
   Returns the tree class object at the Index position in the list.

TABLE 38-continued

HarvestedTreeClasses object 128

QMD As Single

Quadratic mean diameter or the DBH of a tree
    with average BA. Calculated as:
    When TreeClasses object represents standing trees:
        QMD = BA/TPA*4*144/π
    When TreeClasses object represents cut trees:
QMD = BA/TreeCount*4*144/π
RelativeDensity As Single Relative density (e.g., Curtis 1982). Calculated as:
        RelativeDensity = BA/QMD½.
Sort(Type as Long)

Sorts the tree class objects in the list. Type interpreted as
    a bit filed where bit 1 sorts
    by species and bit 2 sorts by DBH. Sorting order parallels bit order.
TPA(MinDBH As Single, MaxDBH As Single) As Single
Events
Remarks Table 39 illustrates properties, methods and events of BDQ object 130. However, more or fewer properties, methods and events could also be used.

TABLE 39

BDQ object 130

Description
BDQ object 130 provides a TPA versus DBH for a set
of TreeClass objects 54.
Members TPA(long MInDBH, long MaXDBH) as Single
    Returns a TPA for classes of trees between MInDBH and MaxDBH.
Remarks

• BDQ averages DBH to the nearest whole #. For example,
  a TreeClass 54 with DBH
  = 12.7 will be reported by BDQ as a 13 inch TreeClass.

Environmental Quality Objects

Figure 10:
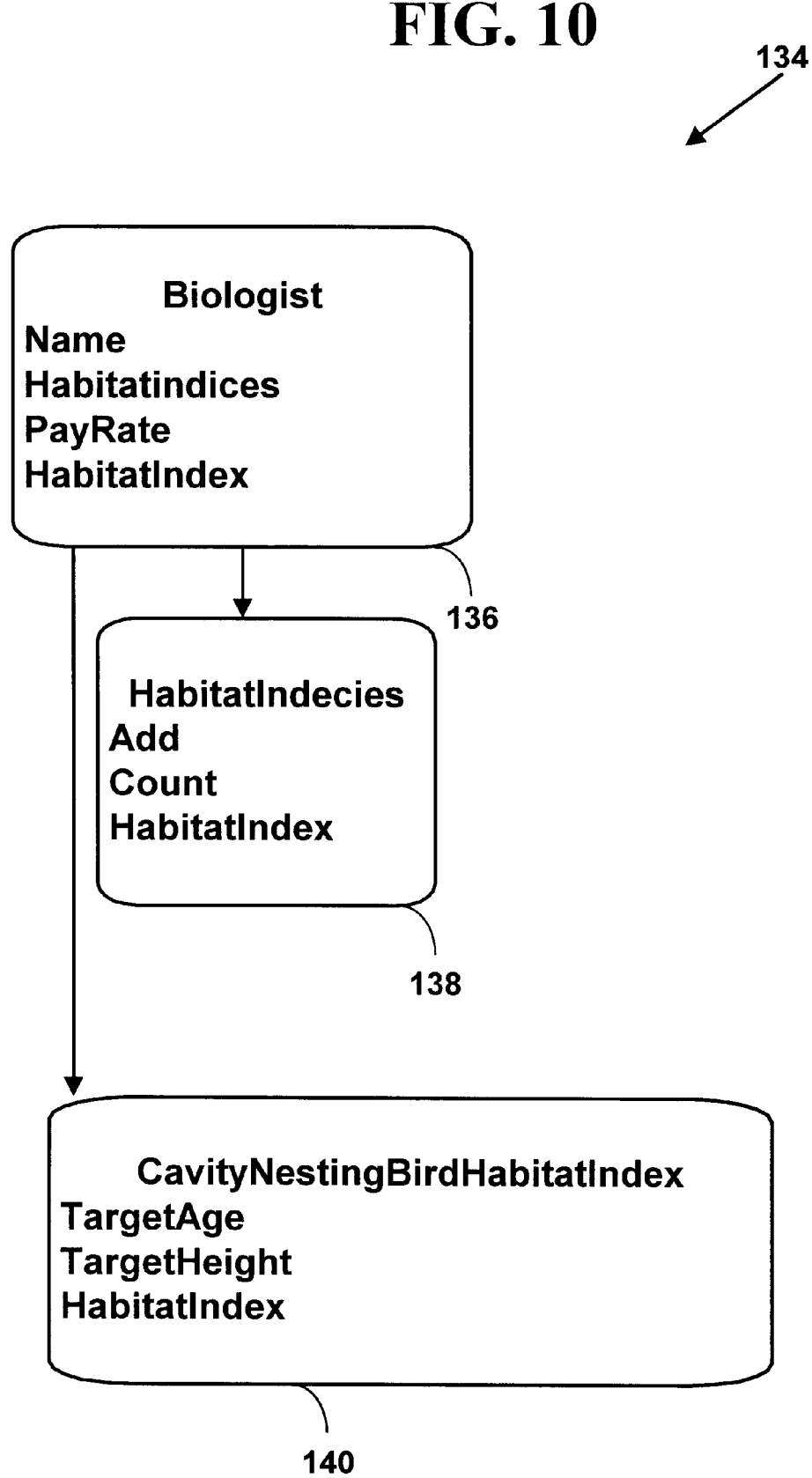
FIG. 10 is a block diagram illustrating Environment Quality objects.

In an illustrative embodiment of the present invention, quality of a simulated forested environment can also be assessed using one or more Environmental Quality objects 134. FIG. 10 is a block diagram illustrating Environmental Quality objects 134. Environmental Quality objects include a Biologist object 136, a HabitatIndices object 138 and a CavityNestingBirdHabitatIndex object 140.

Biologist object 136 calculates the quality of habitat for specific species using HabitatIndices object 138. Biologists object 136 HabitatIndices object member holds the results of habitat quality calculations. CavityNestingBirdHabitatIndex object 140 is a habitat index for birds that prefer a specific habitat in stands in older growth forests. However, other objects for other biological species besides birds could also be used by Biologist object 136.

Table 40 illustrates properties, methods and events of Biologist object 136. However, more or fewer properties, methods and events could also be used.

TABLE 40

Biologist object 136

Description

Biologist object 136 samples stands for habitat quality
by calculating indices that reflect the

TABLE 40-continued

Biologist object 136 quality of habitat for a certain species. Habitat Indices
can be calculated for any number of
stands.
Members Name as String
    User supplied name of object.
HabitatIndices as HabitatIndicies
    List of HabitatIndencies objects to calculate. Read only.
PayRate as Float Rate of pay for each stand sampled.
    Billed to organization after completing sample.
HabitatIndex as Sample(string StandList)

Instructs the Biologist to calculate the habitat
    indices defined in the HabitatIndices
    object for the stands given. Format for StandList
    is "Stand1;Stand2; . . ." where
    "Stand1", etc. is the name of individual stands
    to be sampled. The habitat indices
    calculated from the sample is returned through
    a HabitatIndices object 138.
Remarks

• Set up habitat index objects using the HabitatIndices
  object member, then call
  Sample( ) to calculate them.
• Loop through the habitat index objects in the HabitatIndices
  object 138 to access the
  value of the indices.

Table 41 illustrates properties, methods and events of HabitatIndices object 138. However, more or fewer properties, methods and events could also be used.

TABLE 41

HabitatIndices object 138

Description
HabitatIndices object 138 holds a list of habitat index objects.
Members
Add(long Type)

Creates a new habitat index object of the type
    specified and adds it to the list.
    Returns the habitat index object created.
Count as Long
    Returns the number of habitat index objects in the list.
HabitatIndex as Item(long Index)
    Returns the habitat index object at the Index position in the list.
Remarks Table 42 illustrates properties, methods and events of CavityNestingBirdHabitatIndex object 140. However, more or fewer properties, methods and events could also be used.

TABLE 42

CavityNestingBirdHabitatIndex 140

Description

CavityNestingBirdHabitatIndex object 140 is a
habitat index for birds that prefer habitat in stands
with older growth. The index is calculated as:
Index = stand average height/TargetHeight * stand
average age/TargetAge * stand area.
Members TargetAge as Float
    Ideal tree age for cavity nesting bird habitat.

TABLE 42-continued

CavityNestingBirdHabitatIndex 140

TargetHeight as Float
   Ideal tree height for cavity nesting bird habitat.
HabitatIndex as Float
   Value of habitat index.
Remarks

* Access HabitatIndices object 138 through the HabitatIndices member of Biologist object 136.
* Set the target age and height. After calling the Sample object member Biologist object 136 the HabitatIndex member will be set with the value for this index.

Implementation

An illustrative embodiment of the present invention includes components written in Visual C++, Visual Basic, ActiveX and OLE all by Microsoft Corporation of Redmond, Wash. The components are used on a Windows 95 or Windows NT operating systems by Microsoft. However, the present invention is not limited to these programming languages, development environments or operating systems, and others can also be used. An object-oriented library of objects including the object-oriented objects illustrated in Tables 1–2 is included with an illustrative embodiment of the present invention.

A forestry simulation is typically conducted on large number of stands over a long pre-determined time period such as 100 years. The forestry simulation typically includes simulating the growth of hundreds of thousands of trees with TreeClass objects 54.

FIG. 11 is a block diagram illustrating an exemplary screen display 142 for an exemplary forestry simulation for an illustrative embodiment of the present invention. Screen display 142 includes first window 144 illustrating a screen display for the Simulation Control object, a second window 146 illustrating a screen display for forest resources including standing volume by stand, tree class and log viewer and a third window 148 illustrating a screen display for management actions applied to the forest resources. Second window 146 includes Douglas Fir and Grand Fir simulated trees in a simulated stand using one or more of TaperTreeClass object, or Stand object 58. Third window 148 includes management actions of clear cut, plant and thin applied to the forest resources of trees and stands in second window 146 using one or more of ClearCuttingRule object 90, ThinningRule object 98 or PlantingRule object 102.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A computer executable method for simulating forest management, comprising the steps of:

selecting a plurality of TreeClass object-oriented objects to be used with a Stand object-oriented object;

assigning the plurality of TreeClass object-oriented objects to a specific simulated stand within a Stand object-oriented object;

creating a stand model for simulating growing a plurality of simulated trees with the assigned TreeClass object-oriented objects in the specific simulated stand for the Stand object-oriented object;

adding the stand model to an Ownership object-oriented object; and adding the Ownership object-oriented object with the stand model to an Organization object-oriented object; and adding the stand model and the Organization object-oriented object to a database, wherein a plurality of stand models and a plurality of Organization object-oriented objects from the database are used to construct an object-oriented forest resource model that is used to make comparisons among a plurality of different Organizations with a plurality of different simulated stand models.

2. A computer readable medium having stored therein instructions for causing a central processing unit to execute the method of claim 1.

3. The method of claim 1 wherein the step of selecting a plurality of TreeClass object-oriented objects includes selecting a plurality of TreeClass object-oriented objects for classes of actual trees determined from an actual forested stand owned by an organization.

4. A computer executable method for simulating forest management, comprising the steps of:

selecting a first Organization object-oriented object for a first organization, wherein the first Organization object-oriented object includes a plurality of objects related to management practices of simulated forest lands for the first organization;

selecting a second Organization object-oriented object for a first organization, wherein the second Organization object-oriented object includes objects related to management practices of simulated forest lands for the second organization, wherein the second Organization object-oriented includes a plurality of objects related to management of simulated forest lands different from the first Organization object;

opening an accounting on a plurality of simulated stands for the first organization;

opening an accounting on a plurality of simulated stands for a second organization;

simulating growing a plurality of simulated trees on a plurality of first simulated stands for the first organization;

simulating growing a plurality of simulated trees on a plurality of second simulated stands for the second organization;

applying a plurality of forest management actions associated with the first Organization object to the plurality of first simulated stands for the first organization;

applying a plurality or forest management actions associated with the second Organization object to the plurality of second simulated stands;

closing the first accounting on the plurality of simulated stands for the first organization;

closing the second accounting on the plurality of simulated stands for the second organization; and comparing the first accounting with the second accounting to determine whether the management practices of the first organization or the second organization produce more income, wherein the first accounting and the second accounting are compared from an Accountant object-oriented object using the results of one or more management actions from a set of object-oriented Forest Management objects, wherein the one or more management actions specify a time period, a simulated stand, an action to be carried out, and an associated management rule.

5. A computer readable medium having stored therein instructions for causing a central processing unit to execute the method of claim 4.

6. The method of claim 4 further comprising:

determining a first environment quality on the plurality of first simulated stands for the first organization before closing the first accounting;

determining a second environment quality on the plurality of second simulated stands for the second organization before closing the second accounting; and comparing the first environmental quality with the second environmental quality to determine whether the management practices of the first organization or the second organization produce a better environment quality wherein the first environmental quality and the second environmental quality are compared from a Biologist object-oriented object Using the results of one or more management actions from a set of object-oriented Forest Management objects, wherein the one or more management actions specify a time period, a simulated stand, an action to be carried out, and an associated management rule.

7. The method of claim 4 further comprising:

determining a first simulated tree mortality rate on the plurality of first simulated stands for the first organization before closing the first accounting;

determining a second simulated tree mortality rate on the plurality of second simulated stands for the second organization before closing the second accounting; and comparing the first tree mortality with the second tree mortality to determine whether the management practices of the first organization or the second organization produce a smaller simulated tree mortality rate, wherein the first tree mortality and the second tree mortality are compared from a selected Stand object-oriented object using the results from one or more management actions from a set of object-oriented Forest Management objects, wherein the one or more management actions specify a time period, a simulated stand, an action to be carried out, and an associated management rule.

8. A computer readable medium having stored therein an object-oriented data structure for simulating a class of trees, the object-oriented data structure including a plurality of object-oriented data structure members, the computer readable medium comprising:

an object-oriented data structure member for tree age;

an object-oriented data structure member basal area per acre;

an object-oriented data structure member for bark thickness ratio;

an object-oriented data structure member for crown ratio;

an object-oriented data structure member for maximum crown width;

an object-oriented data structure member for diameter at breast height;

an object-oriented data structure member for diameter inside bark at a given height;

an object-oriented data structure member for diameter outside bark at a given height;

an object-oriented data structure member for an amount of volume in a tree;

an object-oriented data structure member for height of a tree from base to diameter at breast height point;

an object-oriented data structure member for height of a tree from base to tip;

an object-oriented data structure member for tree mortality based on tree age;

an object-oriented data structure member for maximum tree age;

an object-oriented data structure member for tree species;

an object-oriented data structure member trees-per-acre; or an object-oriented data structure member for a number of individual trees represented.

9. The computer readable medium of claim 8 wherein the object-oriented data structure for simulating a class of trees is a TreeClass object-oriented object.

* * * * *